US007171433B2

(12) United States Patent
Wolfe et al.

(10) Patent No.: US 7,171,433 B2
(45) Date of Patent: Jan. 30, 2007

(54) DOCUMENT PRESERVATION

(76) Inventors: Gene J. Wolfe, 490 East St., Pittsford, NY (US) 14534; Seth A. Borg, 300 Council Rock Ave., Rochester, NY (US) 14618

( * ) Notice: Subject to any disclaimer, the term of this patent is extended or adjusted under 35 U.S.C. 154(b) by 425 days.

(21) Appl. No.: 10/625,692

(22) Filed: Jul. 24, 2003

(65) Prior Publication Data

US 2004/0163033 A1    Aug. 19, 2004

Related U.S. Application Data

(60) Provisional application No. 60/398,114, filed on Jul. 25, 2002.

(51) Int. Cl.
*G06F 17/30* (2006.01)

(52) U.S. Cl. .................................................... 707/203

(58) Field of Classification Search ............. 707/1–10, 707/100–104.1, 200–206
See application file for complete search history.

(56) References Cited

U.S. PATENT DOCUMENTS 5,832,499 A * 11/1998 Gustman ................ 707/103 R
6,212,527 B1 * 4/2001 Gustman .................... 707/102
6,353,831 B1 * 3/2002 Gustman ................ 707/103 R
6,748,382 B1 * 6/2004 Mohan et al. ................ 707/10
2005/0149538 A1 * 7/2005 Singh et al. ................ 707/100

FOREIGN PATENT DOCUMENTS

WO    WO 99/59083 A    11/1999
WO    WO 00/39713 A     7/2000

OTHER PUBLICATIONS

Samuel Gustman et al., Supporting access to large digital oral history archives, Jul. 13-17, 2002, ACM Press, New York, NY, pp. 18-27.*
XP-002268836—B. Cooper et al. "Implementing A Reliable Digital Object Archive" 2000 Internet Article, pp. 1-12.
XP-002268837—Arturo Crespo et al. "Cost-Driven Design For Archival Repositories" Jun. 24-28, 2001, pp. 363-372.
XP-002268838—Crespo et al. "Archival Storage For Digital Libraries" Jun. 23-26, 1998, pp. 69-78.
International Search Report, Date of Mailing Feb. 23, 2004.

* cited by examiner

*Primary Examiner*—Diane Mizrahi
(74) *Attorney, Agent, or Firm*—Sheridan Ross P.C.

(57) ABSTRACT

Content, such as a document, in a native format and modality are acquired for preservation. A plurality of interfaces, specific to the type of content, receive the content to be preserved. The received content is indexed and preserved on a preservation media for an indefinite or predetermined amount of time. The media is specially selected such that preservation for an indefinite or predetermined amount of time is possible.

32 Claims, 20 Drawing Sheets

Fig. 9

DOCUMENT PRESERVATION

RELATED APPLICATION DATA

This application claims the benefit of and priority under 35 U.S.C. §119(e) to U.S. Patent Application Ser. No. 60/398,114, filed Jul. 25, 2002, entitled "Preservation System," which is incorporated herein by reference in its entirety.

BACKGROUND OF THE INVENTION

1. Field of the Invention

In general, the systems and method of this invention relate to content preservation. In particular, the systems and methods of this invention are directed to toward receiving content and preserving that content for an indefinite or predetermined amount of time.

2. Description of Related Art

Content, such as documents, can be produced on a variety of devices and are available in a multiplicity of formats. For example, modalities can include computer word processing documents, spread sheets, presentations, images, hand-written documents, and the like. Documents typically have a visual representation mode congruent with human cognition. A documents representation and it physical modality may have disjoint appearances, for example, a magnetic media with documents stored thereon may have no visible appearance, however may have an electromagnetic interpretation that is human readable.

SUMMARY OF THE INVENTION

All the above-described types of content have a life-span that is generally tied to the type of media the document is recorded on that may not be equivalent to the needed life-span of the document. Thus, a need exists to preserve information for a period of time longer than the native modality of the information storage media. Specifically, preservation, as referred to herein, is defined as immutable storage for an indefinite or predetermined amount of time. For example, preservation can be conventionally defined as immutable storage for times greater than seven years, while storage is typically less than seven years.

Accordingly, the systems and methods of this invention start with content, such as a document, in a native format and modality. A plurality of interfaces, specific to the type of content, receive the content to be preserved. The received content is indexed and preserved on a preservation media for an indefinite or predetermined amount of time. The media is specially selected such that preservation in accordance with the above definition is possible.

Accordingly, an exemplary aspect of the invention relates to preservation of content.

Additional exemplary aspects of the invention relate to preserving documents for an indefinite or predetermined amount of time.

Further aspects of the invention relate to providing a document vault that allows the storage, retrieval, and administration of content within a content preservation system.

Additional aspects of the invention related to various implementations of a document vault.

Further aspects of the invention relate to providing a print cartridge, toner bottle, ink reservoir, or the like, having document vault functions contained therein associated with a laser printer, digital print press, or other image forming device.

Further aspects of the invention relate to providing any electronic device, such as a digital camera, video recorder, PDA, communications device, or the like, having document vault functions contained therein.

Exemplary aspects of the invention also relate to a user interface that allows the receipt and retrieval of documents, as well as the administration of a document preservation system.

Aspects of the invention further relate to methods for document preservation.

Additional aspects of the invention relate to methods for preserved content retrieval.

Additional aspects of the invention relate to methods for preserved document retrieval.

Aspects of the invention also relate to methods for preservation system management.

These and other features and advantages of this invention are described in or are apparent from the following detailed description of the embodiments.

BRIEF DESCRIPTION OF THE DRAWINGS

The embodiments of this invention will be described in detail, with reference to the following figures, wherein:

FIGS. 4–17 are screen shots of an exemplary user interface that allows access to the preservation system according to this invention;

DETAILED DESCRIPTION OF THE INVENTION

Figure 1:
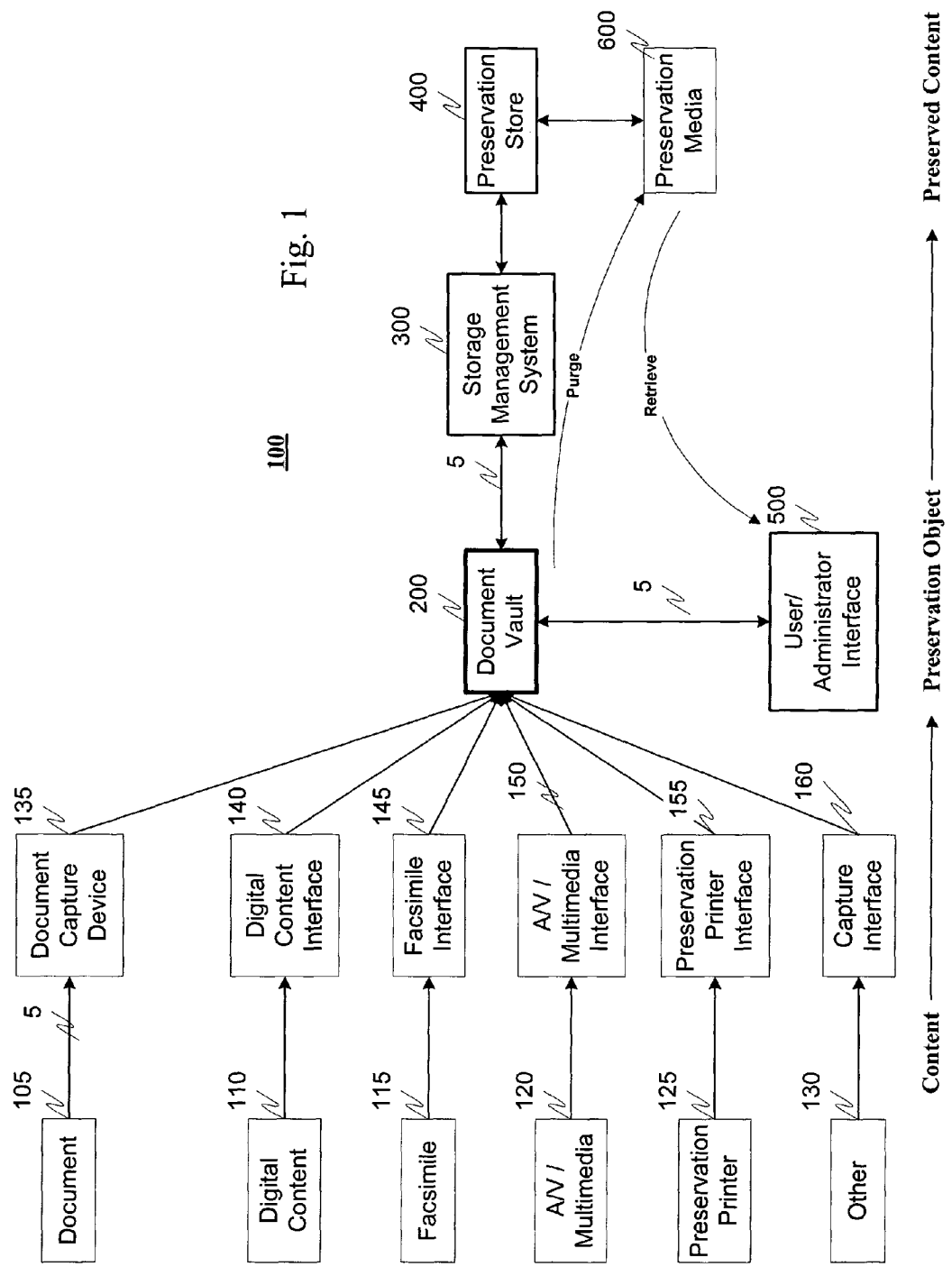
FIG. 1 is a functional block diagram illustrating an exemplary embodiment of a preservation system according to this invention.

The exemplary preservation system discussed herein comprises 5 distinct systems. In particular, a capture system, a storage system, a preservation media system, a management system and a recall system. Specifically, the preservation system 100 comprises a document vault 200, a storage management system 300, a preservation store 400, a user interface 500, preservation media 600, a plurality of different types of content 105, 110, 115, 120, 125 and 130, and corresponding content interfaces 135, 140, 145, 150, 155 and 160, respectively.

The exemplary systems and methods of this invention will be described in relation to a preservation system. However, to avoid unnecessarily obscuring the present invention, the following description omits well-known structures and devices that may be shown in block diagram form or otherwise summarized. For the purpose of explanation, numerous specific details are set forth in order to provide a thorough understanding of the present invention. It should be however appreciated that the present invention may be practiced in a variety of ways beyond the specific details set forth herein.

Furthermore, while the exemplary embodiment illustrated herein show the various components of the preservation system collocated, it is to be appreciated that the various components of this system can be located at distant portions of a distributed network, such as a LAN and/or the internet, or within a dedicated preservation system. As an example, the capture system could be disjoint from the preservation media. Thus, it should be appreciated that the components of the preservation system can be combined into one or more devices, or collocated on a particular node of a distributed network, such as a communications network. It will be appreciated from the following description, and for reasons of computational efficiency, that the components of the preservation system can be arranged at any location within a distributed network without affecting the operation of the system.

Furthermore, it should be appreciated that the various links connecting the elements can be wired or wireless links, or any combination thereof, or any other known or latter developed element(s) that is capable of supplying and/or communicating data to and from the connected elements. Likewise, these links may involve physical transportation of a preservation system component, media volume, datum, or the like. Additionally, the term module as used herein can refer to any known or later developed hardware, software, or combination of hardware and software that is capable of performing the functionality associated with that element.

In operation, and in general, the preservation system 100 allows the importation of content, the exportation of content, and/or administration of the system itself. For importation of content, the content is received in association with the content's corresponding interface. Upon receipt of the content at the document vault 200, the content is captured and/or processed in preparation for storage on the preservation media 600. In conjunction with the capturing and/or processing process, metadata about the content is also assembled based on, for example, a profile, information associated with the capture device, or other criteria. The content may also be rendered and simulated for the preservation media's capabilities and format. As discussed hereinafter, the metadata can include various types of information including creation information, origination information, content information, subject information, format information, or the like. Once the metadata for the content is assembled, the content is placed in temporary storage where the content and the associated metadata will be referred to as a preservation object.

Upon association of the metadata with the content, processing, simulation, rules, profile and/or user interface, the preservation object is forwarded to the storage management subsystem 300 and placed in a queue for preservation. The time and type of preservation can be based on, for example, a profile and/or other governing criteria and/or be dynamically determined as discussed hereinafter. Upon a triggering event occurring that governs preservation of the preservation object, the preservation object is forwarded, via link 5, to the preservation store 400 which physically preserves the preservation object on preservation media 600. The preservation store 400 also communicates information back to the storage management subsystem 300 that indicates, for example, when and where the preservation object is stored to facilitate, for example, latter retrieval.

To retrieve content from the preservation media 600, a user, for example via the user interface 500, searches and or selects one or more items of content. In particular, if a search is received from a user, the search is forwarded, via the document vault 200, to the storage management subsystem 300 that stores the indexes corresponding to the preserve content. Upon locating the preserved content, the document vault 200 issues a request to the storage management system 300 for retrieval of the preserved content by placing the request in a queue. Then, for example, depending on one or more of information in the request, a profile, or the like, the storage management system 300, with the cooperation of the preservation store 400, retrieves the content from an associated preservation media 600. The content, upon retrieval, is then forwarded from the storage management system 300 to temporary storage in the document vault 200. The retrieved preserved content is then forwarded to the user at the user interface 500. In addition, the storage management subsystem 300 can be updated indicating preserved content has been retrieved and forwarded to, for example, a particular user. In addition to the standard importing and exporting duties of the preservation system 100, the preservation system 100, along with the cooperation of the document vault 200 and the user interface 500, allows for the administration of the preservation system 100. In particular, administration can relate to managing profiles, managing one or more indexes in a storage management subsystem 300, managing preservation or retrieval queues, managing user information and/or group information, access rights, metadata farming techniques, or the like.

More specifically, document 105, such as a text document, word processing document, book, magazine, or in general any of the wide variety of printed information is received by the document capture device 135. The document capture device 135, such as a scanner, produces a representation of the document 105 that is forwarded to the document vault 200. In addition to the representation of the document, the document is capable of being processed by optical character recognition software to capture the content of the document. Furthermore, it should be appreciated, that the document capture device 135, and other various interfaces 140–160, are also capable of obtaining information regarding, for example, origination information about the document, user information, or the like, that can supplement the metadata associated with the content.

As with all the content that is forwarded to the document vault 200, the respective content interfaces can compress and or secure the content for transmittal to the document vault 200 as necessary. Once the document 105 is at the document vault 200, processing on the document continues as generally discussed above for preservation of the document on the preservation media 600.

As an alternative type of content, digital content 110, such as e-mail, a web page or family of web pages, digital photographs, electronic documents, or the like, are processed by the digital content interface 140. The digital content interface 140 can, for example, convert the various types of digital content into a predetermined format and, as discussed above, compress and/or secure the content for transmittal to the document vault 200. Also as discussed above, the content interfaces can simulate conversion and transmittal content.

A third type of content is the facsimile 115. As with the other documents, the facsimile 115 is received via the facsimile interface 145, such as a fax machine, or other device capable of receiving a facsimile transmission. As discussed above, the facsimile interface 145 can also capture information, such as the senders identification, date and time information, content information, or the like, which can supplement the metadata added by the document vault 200.

An additional type of content that can be preserved is A/V or multimedia content 120. For example, movies, sounds, songs, or in general any type of audio and/or video information can also be preserved on preservation media 600. In particular, the A/V multimedia content 120 is forwarded to the multimedia interface 150. The multimedia interface processes, for example, by digitizing, the received content for delivery over link 5, to the document vault 200. As with the remainder of interfaces, the multimedia interface 150 is capable of obtaining information about the received content. For example, upon a user submitting the content to the particular interface, the interface, in cooperation with the document vault 200, can query the user to enter information about the particular content. For example, author information, production information, copyright information, distribution information, usage information, digital rights information, or the like can be captured by the particular interface that receives the content. Then, as discussed above, all or a portion of this information can be used as metadata by the document vault 200.

As an alternative embodiment, the preservation printer 125 is a data store in itself associated with a particular printer, printing press, video source and/or image forming apparatus. In accordance with a specific exemplary embodiment, the preservation printer 125 includes a data store that is associated with a toner cartridge, ink well, or the like. Thus, the data store maintains a record of all or a portion of documents printed at the preservation printer 125. Then, at a predetermined time, such as capacity of the printer store being reached, exchange of the toner cartridge, or the like, the information stored on the data store at the preservation printer 125 is transferred, with the cooperation of the preservation printer interface 155 and link 5, to the rest of the document vault 200. As an example, the preservation store in the preservation printer 125 can connect, via distributed network, to the preservation printer interface 155. The preservation printer interface 155 can download all, or a portion, of the documents stored on the preservation printer data store. Alternatively, and as with toner cartridges today, a spent toner cartridge can be sent to a predetermined location. This predetermined location can then, for example, associate the spent toner cartridge and associated data store with a data store reader, such as the preservation printer interface 155, that is capable of downloading all or a portion of the information stored on the data store. This information can then be forwarded to the document vault 200, along with any associated metadata, in preparation for preservation.

In addition to the specific types of content discussed above, other types of content 130 can be captured by the capture interface 160 for preservation on the preservation media 600. In general, any type of content in any format can be preserved in accordance with the general operational parameters of the preservation system 100.

Furthermore, it should be appreciated that the various interfaces can cooperate with the preservation system 100 to capture metadata associated with the particular content. Additionally, the metadata need not be limited to information specific to the content itself, but can rather be any information that may be associated with one or more of the content and/or a user(s).

Figure 2:
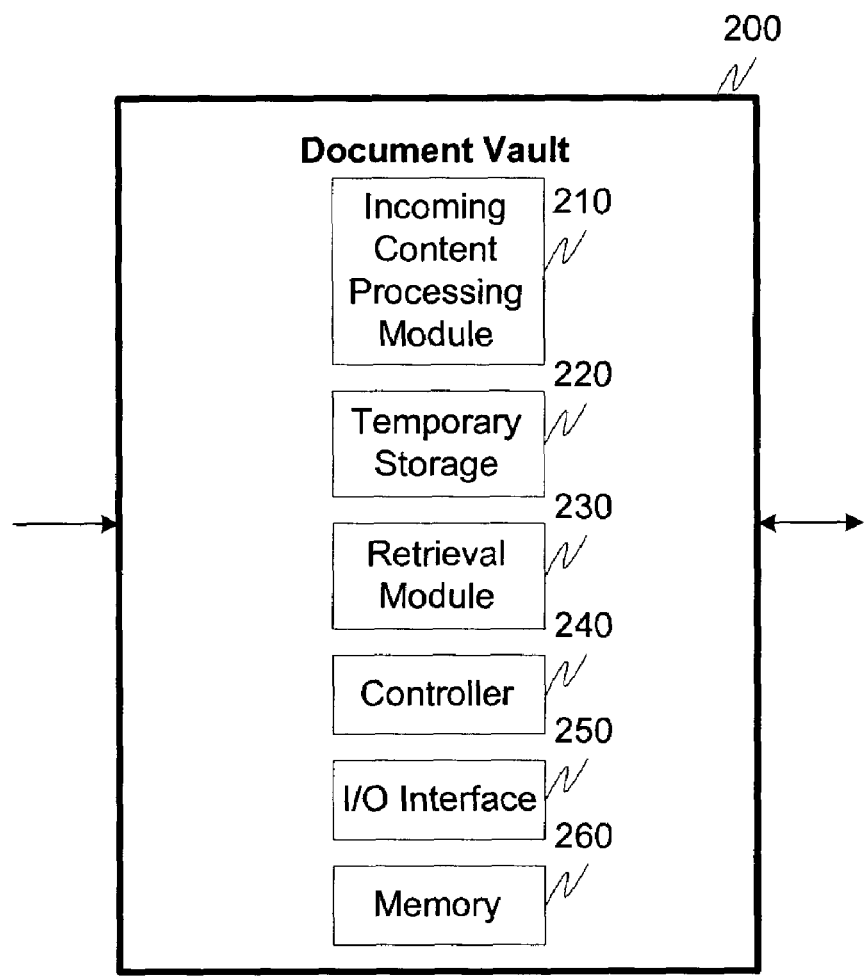
FIG. 2 is a functional block diagram illustrating in greater detail an exemplary embodiment of the document vault according to this invention.

FIG. 2 is a block diagram illustrating in greater detail the components of the document vault 200. In particular, the document vault 200 comprises an incoming content processing module 210, temporary storage 220, retrieval module 230, controller 240, I/O interface 250 and memory 260.

For content preservation, content is received via the specific interface as discussed above. Upon receipt, the incoming content processing module 210, in cooperation with the controller 240, I/O interface 250 and memory 260, stores the content in the temporary storage 220. Additionally, the incoming content processing module 210 associates the metadata information with the content. Specifically, the metadata can be, for example, any characteristic, trait, feature, attribute or property content may have associated with it. Metadata can be unique or shared amongst a plurality of types of content. Furthermore, the metadata can be predefined, intrinsic and/or defined at the time of preservation. Additionally, it should be appreciated that the metadata can also be supplemented, annotated and/or edited at any point in time. In general, each preservation object has at least one unique metadata field that accesses the "serial number" that identifies the preservation object to the preservation system 100. This serial number represents the minimum amount of information the preservation system 100, and in particular the storage management system 300, needs to index the document for preservation, retrieval, and maintenance.

Thus, the incoming content processing module 210 can passively receive information associated with content and identify one or more portions of information as metadata and, as discussed above perform a simulation of content preservation. Furthermore, the incoming content processing module 210 can cooperate with one or more of the interfaces to, for example, dynamically query the interface, or for example a user, about supplemental information that could also be used as metadata. It should further be appreciated that the incoming content processing module 210 can also explore additional systems (not shown) or query the environment for metadata. For example, in the case of a network printer, the incoming content processing module 210 will have available to it information regarding, for example, the name of the print job, the printer identification, time and date information and the like, as well as the ability to actually determine, for example, the identity of the user who printed the print job, the author of the print job, the status of the print job, such as edited, original, copy, or the like, or any other information that could be used or is desired to be associated with the preservation object. Furthermore, incoming content processing module 210 need not be limited to specific information based on the queries from the incoming content processing module 210. For example, a user at user interface 500 can manually associate metadata with any content. Upon the occurrence of a trigger, at a predetermined time, or based on a rule, the preservation object(s) stored in the temporary storage 220 are forwarded to the storage management system 300, with the cooperation of the controller 240, the I/O interface 250 and the memory 260. For example, upon the temporary storage reaching a certain capacity, all or a portion of the preservation object(s) can be forwarded to the storage management system 300. Alternatively, for example, a user at the user interface 500 can manually send one or more preservation objects to the storage management subsystem 300 for preservation.

To retrieve content, in general, and assuming it has been preserved, the user at the user interface 500 selects or searches for preserved content. The retrieval module 230 cooperates with the storage management system 300 and, upon locating the preserved content, places the preserved content in a retrieval queue. Upon retrieval, the preserved content is forwarded and stored in the temporary storage 220 for access by the user at user interface 500.

Figure 3:
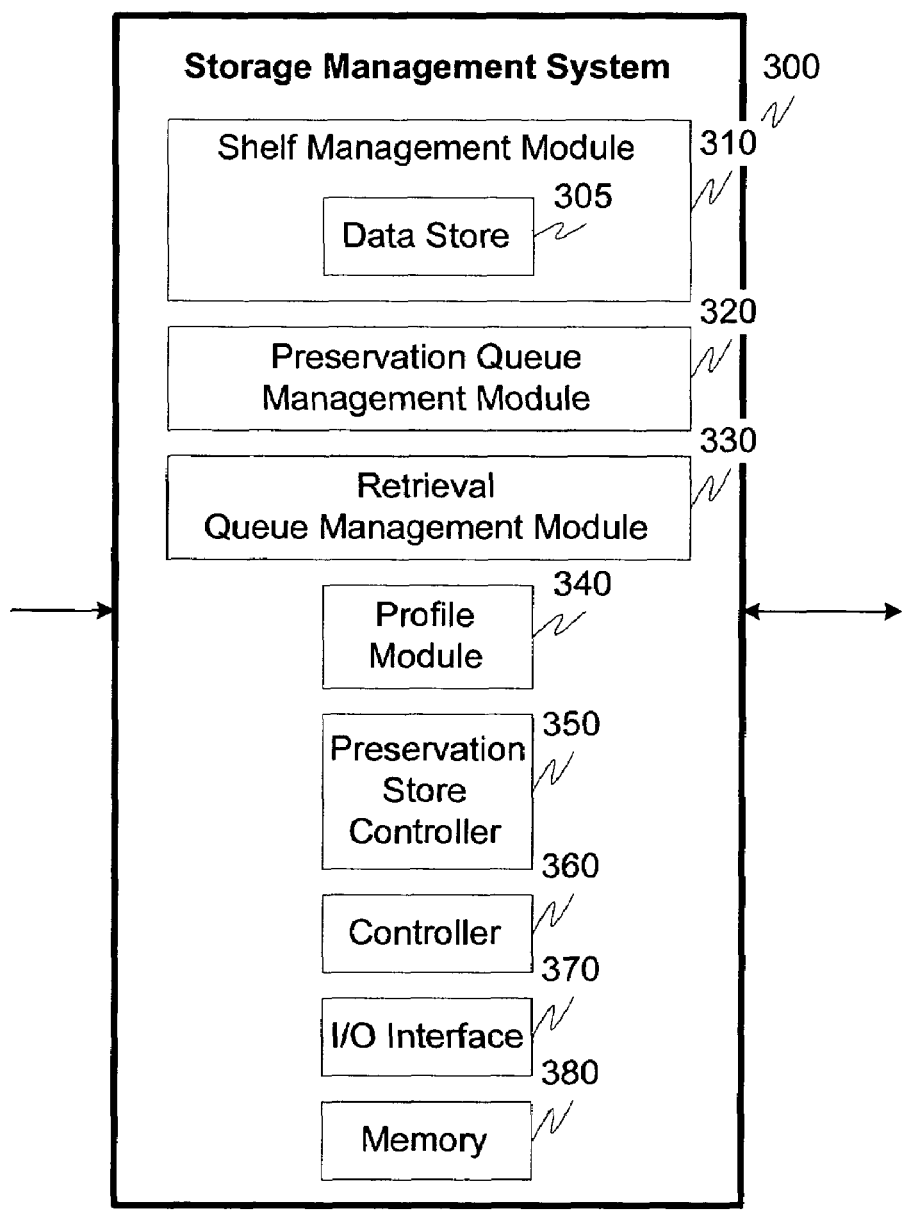
FIG. 3 is a functional block diagram illustrating in greater detail an exemplary embodiment of the storage management system according to this invention.

FIG. 3 illustrates in greater detail an exemplary embodiment of the storage management system 300. The storage management system 300 comprises a shelf management module 310, that comprises a data store 305, a preservation queue management module 320, a retrieval queue management module 330, a profile module 340, a preservation store controller 350, a controller 360, an I/O interface 370 and a memory 380. In general, the storage management system 300 provides classification, indexing, management and retrieval functionality. While some of the services and functions of the storage management system 300 can be equated to a library card catalog, the storage management system 300 extends the functionality to include, for example, other datum and indexers. In addition, the storage management system 300 manages the importation an exportation of preserved content from the preservation media 600. Thus, as discussed hereinafter, the importing and exporting functionalities update the storage management system 300 data store 305.

In general, the self management module 310 and data store 305 perform functions similar to that of a card catalog. In particular, the shelf management module 310, in cooperation with the data store 305, store a surrogate record, e.g., description or metadata, that serves as a short representation of a preservation object. The preservation object(s) are arranged/retrieved by there metadata, such as the preservation object's name, title, keywords, which can be chosen by the shelf management module 310, or otherwise identified, or the like. Thus, for example, the preservation object is capable of being fully indexed and searchable by the shelf management module 310. In addition to these functions, the shelf management module 310 cooperates with the preservation queue management module, profile module 340 preservation store controller 350, controller 360, I/O interface 370 and memory 380 to import a preservation object into the preservation system 100. Specifically, to import content into the preservation system 100, the preservation object is received from the document vault 200. At this stage, additional metadata can be associated with the preservation object by the shelf management module 310. This metadata can include, for example, predicted time and date of preservation, and identification of the particular preservation media to be used, or the like. Furthermore, and in cooperation with the profile module 340, the storage management system 300 determines if there are any particular preferences governing the preservation of the preservation objects. These preferences can include, for example, specifying when the preservation is to occur, the type of indexing to be used on the preservation object, what preservation media volume to use, the priority of the job, duplicate copies to make, or the like. The shelf management module 310 data store 305 also has the ability to preserve its store with a superset of all or a portion of the preservation requirements of the disparate jobs being managed. The shelf management module 310 accomplishes this by preserving its data store as a preservation document itself.

To facilitate actual preservation of the preservation object, the shelf management module 310, in cooperation with the data store 305, preservation queue management module 320, preservation store controller 350, controller 360, I/O interface 370 and memory 380 determine the specifics of the preservation. Next, a priority is assigned to the one or more preservation objects that are to be preserved and the one or more preservation objects are placed in a preservation queue which is managed by the preservation queue management module 320. In addition to the metadata already associated with the one or more preservation objects, the preservation system 100 also provides the opportunity at this point before preservation to associate any additional metadata that may be desired with the preservation object(s) to be preserved. If any supplemental metadata is associated with the preservation object, a data store 305 is updated with the new metadata and preservation object, and at the control of the preservation store controller 350, forwarded to the preservation store 400, via link 5, for physical recordation on the preservation media 600. Upon confirmation that the preservation store 400 has successfully preserved the one or more preservation objects on the preservation media 600, the one or more preservation objects are deleted from a temporary storage.

For a retrieval, one ore more of a search criteria or identity, e.g., serial number, of the preserved content is received from the user interface 500 at the retrieval module 230. The inbound request for the preserved content can specify search criteria that can identify preserved content, operations to be performed, and/or a text model.

Upon confirmation that the preserved content is available, the system can optionally refer to a profile that specifies, for example, retrieval options, display options, forwarding options, or the like. Next, in cooperation with the shelf management module 210, the data store 305, and the retrieval queue management module 330, a logical view of the requested preserved content, e.g., one or more types of content, is generated and a text index assembled. The retrieval request is then placed in the retrieval queue and managed by the retrieval queue management module 330.

The retrieval queue management module 330 cooperates with the preservation store controller 350 to pick the one or more requested documents from one or more preservation media 600. The requested documents are then forwarded, via the storage management system 300, the document vault 200 and link 5 to, for example, the user interface 500, or another destination as specified in profile such as an e-mail address, internet protocol address, fax number, printer, or the like. In conjunction with forwarding of the requested preserved content, the data store 305 is updated indicating, for example, that a user has "checked out" a portion of preserved content.

In addition to forwarding the preserved content to a user through user interface 500, the retrieval module 230 can cooperate with the profile module 340 and any profile associated with the preserved content to control, for example, displaying of the object at the user interface 500, display characteristics, or the like. For example, based on one or more of the above, the rendering application or rendering characteristics can be controlled, or the like. As discussed above, simulation can also be performed at this time by simulating the document's appearance and, for example, displaying it to a user.

The media used for preservation can encompass any combination of a plurality of conventional content storage mechanisms including, but not limited to, ink and paper, film exposed and developed, microfilm, silicon substrates etched lithographically, titanium or similar foil etched with a laser and/or recordable optical disks where the disk is burned with one or more of digital information and a visible image that can be viewed.

FIGS. 4–17 are screen shots of exemplary user interfaces a user and/or an administrator may encounter during interaction with the preservation system 100. However, while the various interfaces illustrated hereinafter may be used with the preservation system 100, it should be appreciated the system can run in the background and, for example, capture content for preservation without requiring user interaction.

While the exemplary embodiments illustrated in the various screen shots hereinafter show numerous types of selection devices, such as radio buttons, pull down menus, buttons, and the like, it should be appreciated that any type of user interface can be used with equal success in accordance with the systems and methods of this invention.

Figure 4:
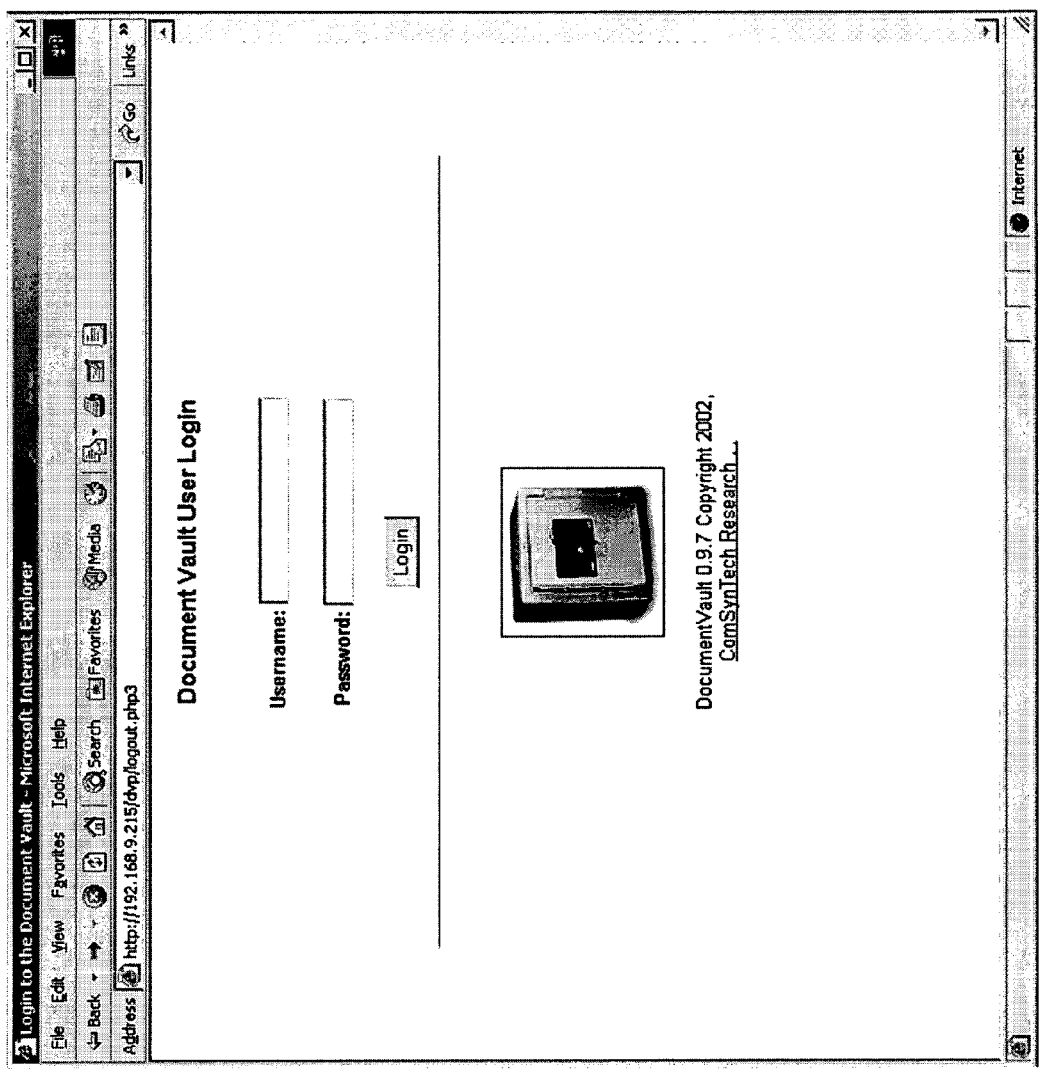
Figure 5:
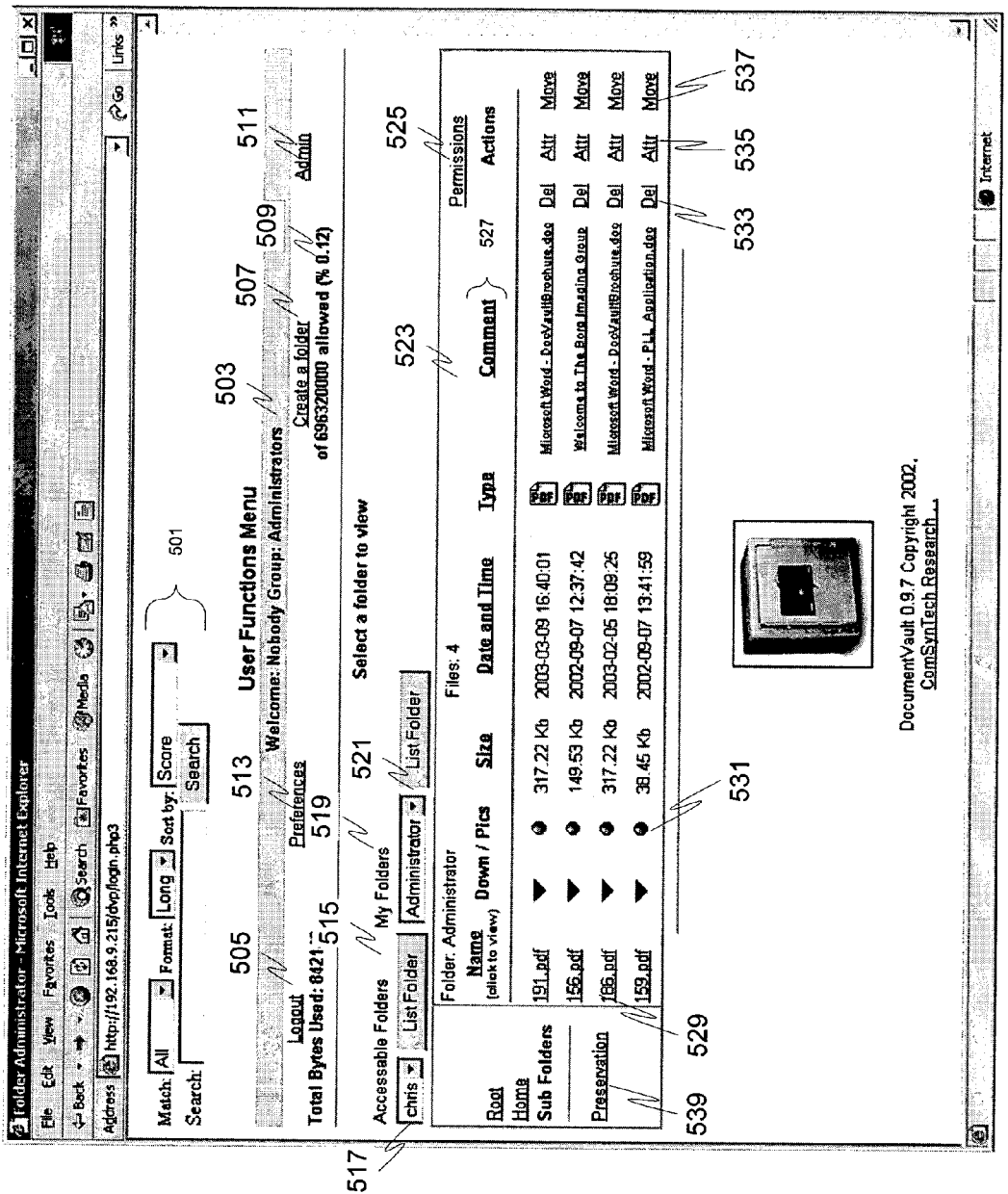

In particular, FIG. 4 illustrates an exemplary and optional login screen that can, for example, query a user/administrator for one or more of a user name and password to gain access to one or more portions of the preservation system 100. In this particular exemplary embodiment, upon entering the correct user name and password and clicking on the "login" button, the user is granted access to preservation system functionality. Specifically, the primary interface for a user is illustrated in FIG. 5. In the various exemplary interfaces disclosed herein, a network browser is used as the conduit for obtaining access to the preservation system 100. However, it should be appreciated, that any type of interface can be used with equal success with the systems and methods of this invention. For example, any type of internet capable browser, or dedicated user interface can be used.

In particular, the search criteria interface 501 in FIG. 5 allows for one or more search terms to be entered for locating preserved content. In addition to selectable options for word matching and sort order, it should be appreciated that not only simple search terms can be entered in the interface 501, but also search terms combined with Boolean operators can be used to facilitate location of preserved content. Additionally, it should be appreciated that searches within searched results are possible to help narrow a particular set of available preserved content. Status interface 503 indicates that the interface is for a user and, for example, any group the user may be associated with and the type of user, such as, administrator, regular user, or the like. If a user chooses to logout, the user could select the logout button 505. Alternatively, if a user selects the preferences button 513, the user is taken to the interface illustrated in FIG. 12.

In addition to the search functionality discussed above, the user can also manage and navigate through folders and preservation objects. In particular, through the use of the create interface 507, a user is able to create one or more additional folders to facilitate, for example, organization of one or more preservation objects. Associated with one or more folders, is the capacity indicator 509 that indicates, for example, one or more of the occupied or available capacity of the system. This capacity can be based on, for example, user requirements, a profile, overall system capacity, or the like. Similarly, the administration button 511, when selected, and if the user is an administrator, forwards the user to the interface illustrated in FIG. 9.

Interfaces 515–539 allow for the selection, management, and organization of folders. In particular, interface 515 indicates the folder(s) currently available to the particular user. For example, through the use of pull down menu 517, the user can quickly access the available folder(s). In a similar manner, the "my folders" interface 519 can provide, for example, a certain subset of folders available to the particular user. The subset of folders is available through, for example, pull down menu 521.

Figure 12:
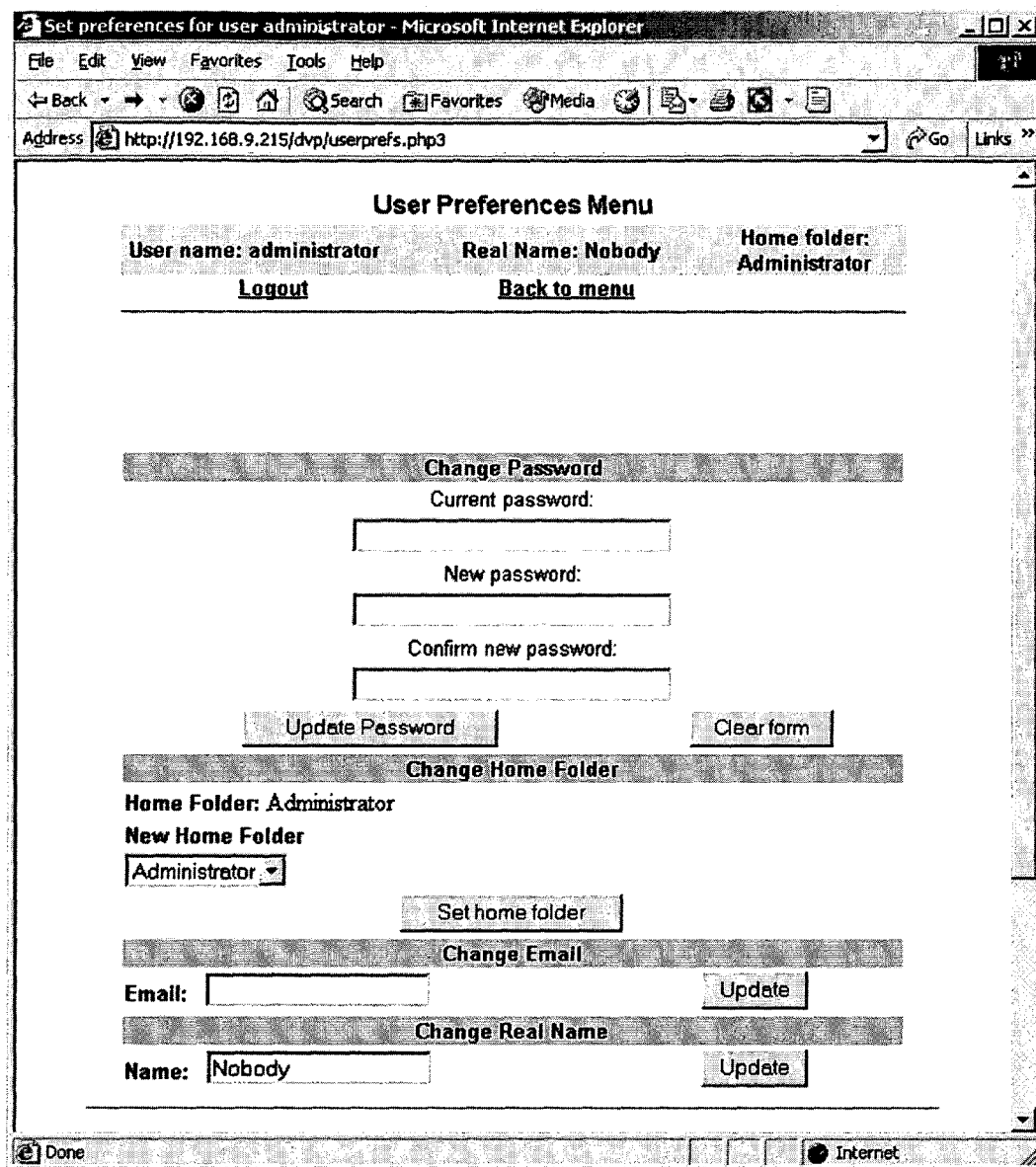

Display portion 523 lists the preservation objects currently contained within the selected folder. For this exemplary embodiment, the selected folder was the administrator folder and there are four files contained therein. Specifically, preservation objects 529 have information associated therewith, that can be sorted, such as by size, date and time, type, comments, actions, or any other filed as appropriate. Specifically, upon selection of the button 531, thumbnails associated with the particular preservation document are retrieved, as illustrated in FIG. 12. Likewise, upon selection of the deletion button 533, the preservation object can be deleted from the preservation queue. Attribute button 535 allows the user to modify and/or add attributes associated with the preservation object. Move button 537 allows the user to move the preservation object to another folder. In a similar manner, a user can "drag and drop" one or more preservation objects between various folders.

The comment section 527 allows a user, and/or metadata, to illustrate comments associated with a particular preservation object. The preservation button 539 allows a user to immediately preserve one or more preservation objects for preservation.

Figure 6:
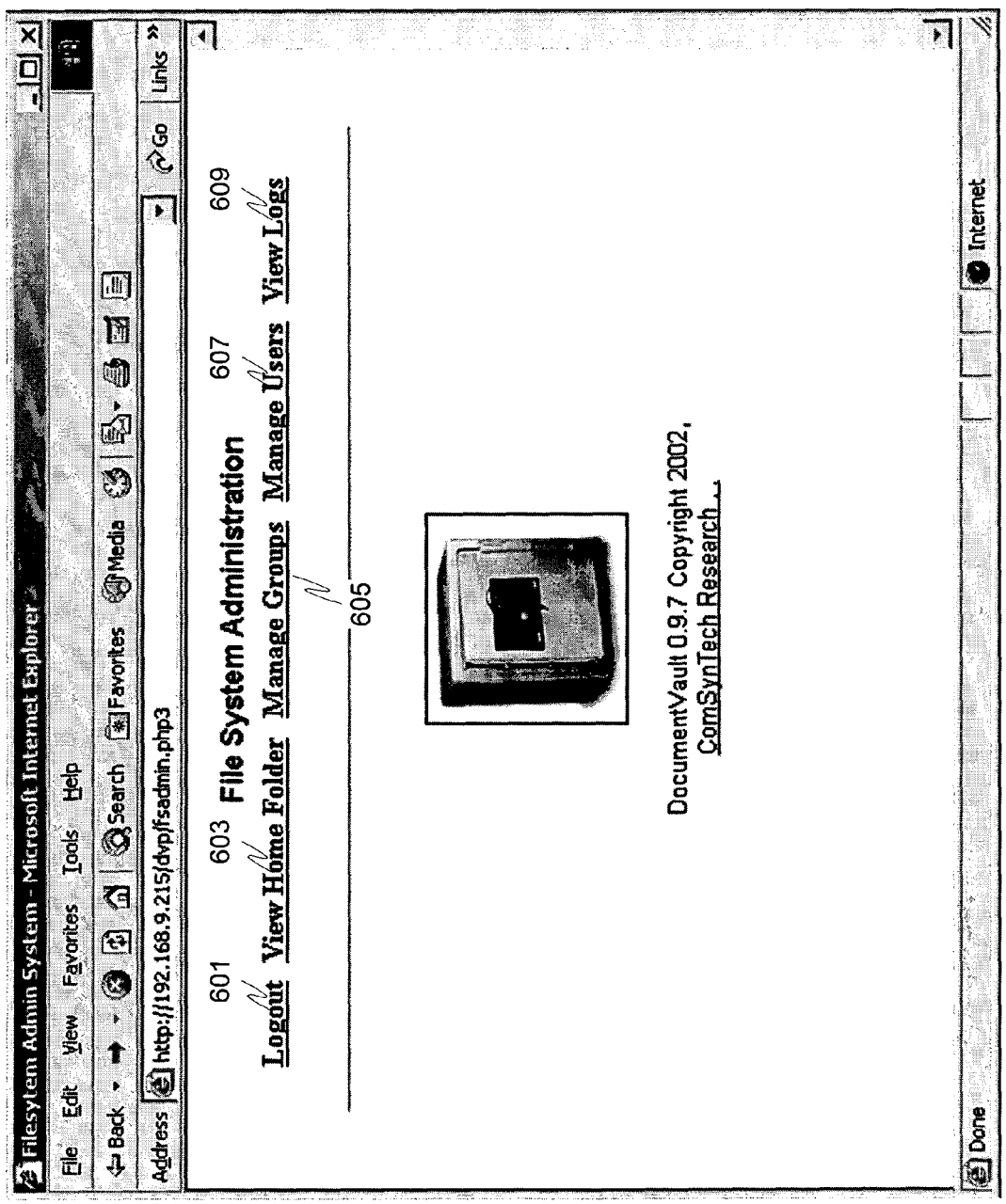

FIG. 6 illustrates high level file system administration functions provided by the preservation system. In particular, button 601 logs a user out of the preservation system. Button 603, when selected, returns the user to the home folder as illustrated in FIG. 5. The manage groups button 605 forwards a user to the interface illustrated in FIG. 7 which allows, for example, the administration of groups and users within those groups. The manage user button 607 forwards the user to the interface illustrated in FIG. 8 that allows specific configuration of users and the access rights for those users to the preservation system. The log button 609 forwards the user to the interface illustrated in FIG. 10 that allows selection and manipulation of one or more logs associated with the preservation system.

Figure 7:
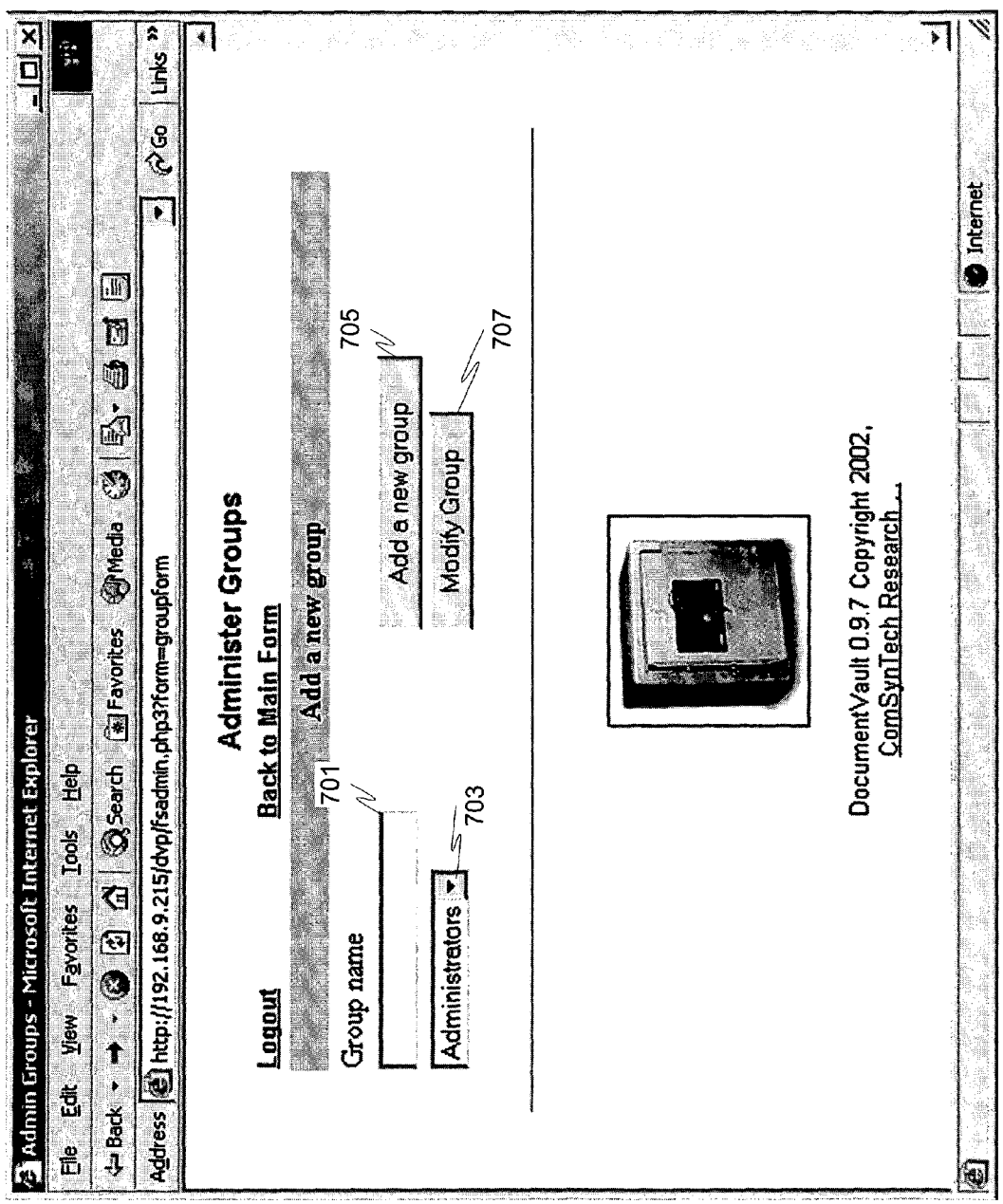

FIG. 7 illustrates the administrator group interface. In particular, and in addition to some of the common functionalities such as logging out and basic navigation, the administrator group interface also includes the ability to add a new group via the button 705 and associated group entry field 701. In addition, one or more existing groups can also be modified through the use of the modified group button 707 and the associated group selection drop down menu 703.

Figure 8:
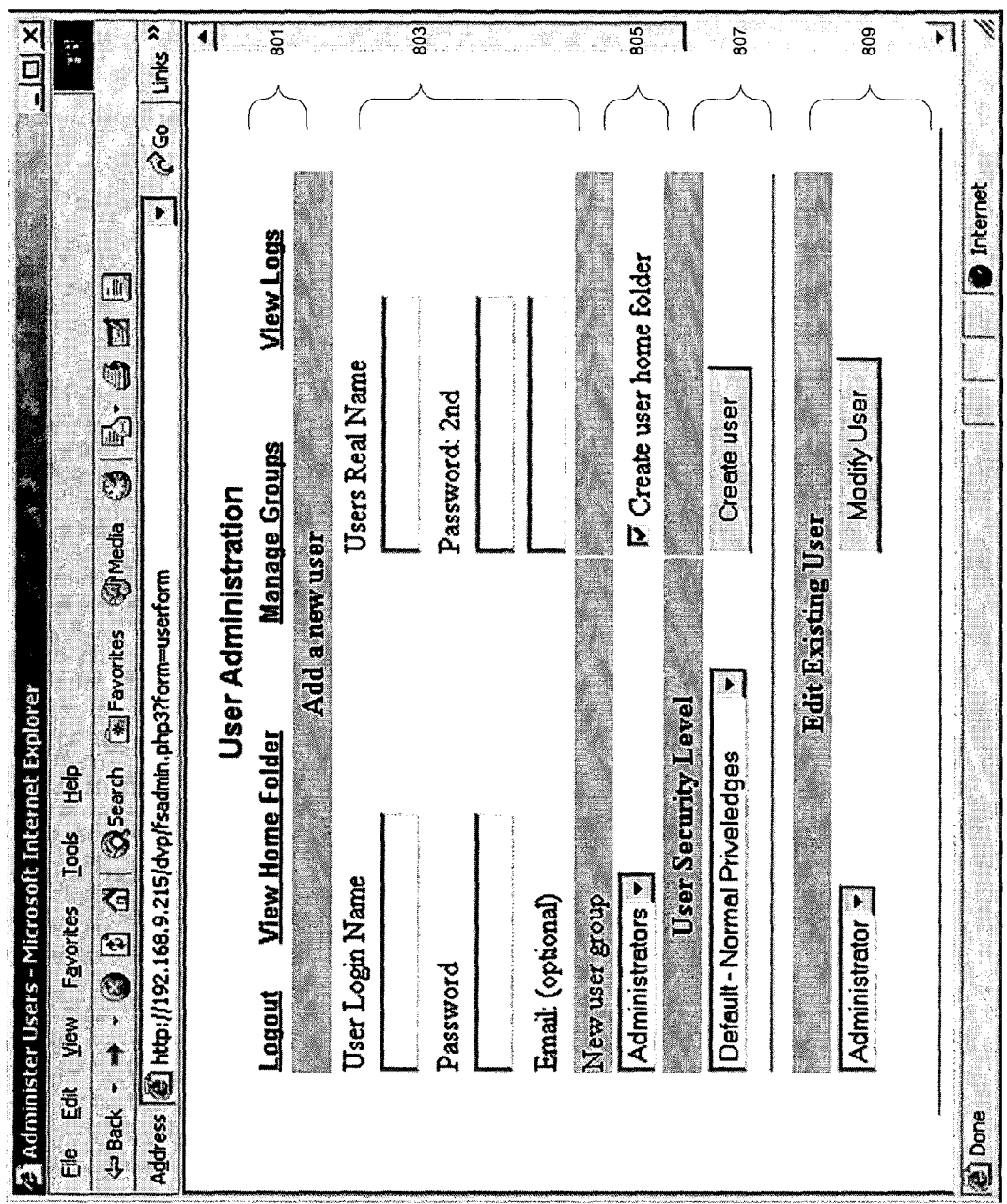

FIG. 8 illustrates an exemplary user administration interface. In particular, the user administration interface allows basic navigation through the selection of links 801. In addition, the user administration interface provides an add new user portion 803 that allows, for example, the adding of a new user where, for example, a login name, password, real name, and/or other identifiers are used to add a new user that is able to access the preservation system 100. In addition to the above, a security level can be associated with the particular user via the security level interface 807. Furthermore, via the group interface 805, association of the user with one or more groups and features such as adding default folders can be managed. In addition to the capability of adding new users, via the edit user interface 809, one or more characteristics of a user can be modified. For example, security levels, storage or retrieval profiles, or in general, any characteristic of a user can be added or edited in accordance with the basic functionality illustrated in the user administration interface.

Figure 9:
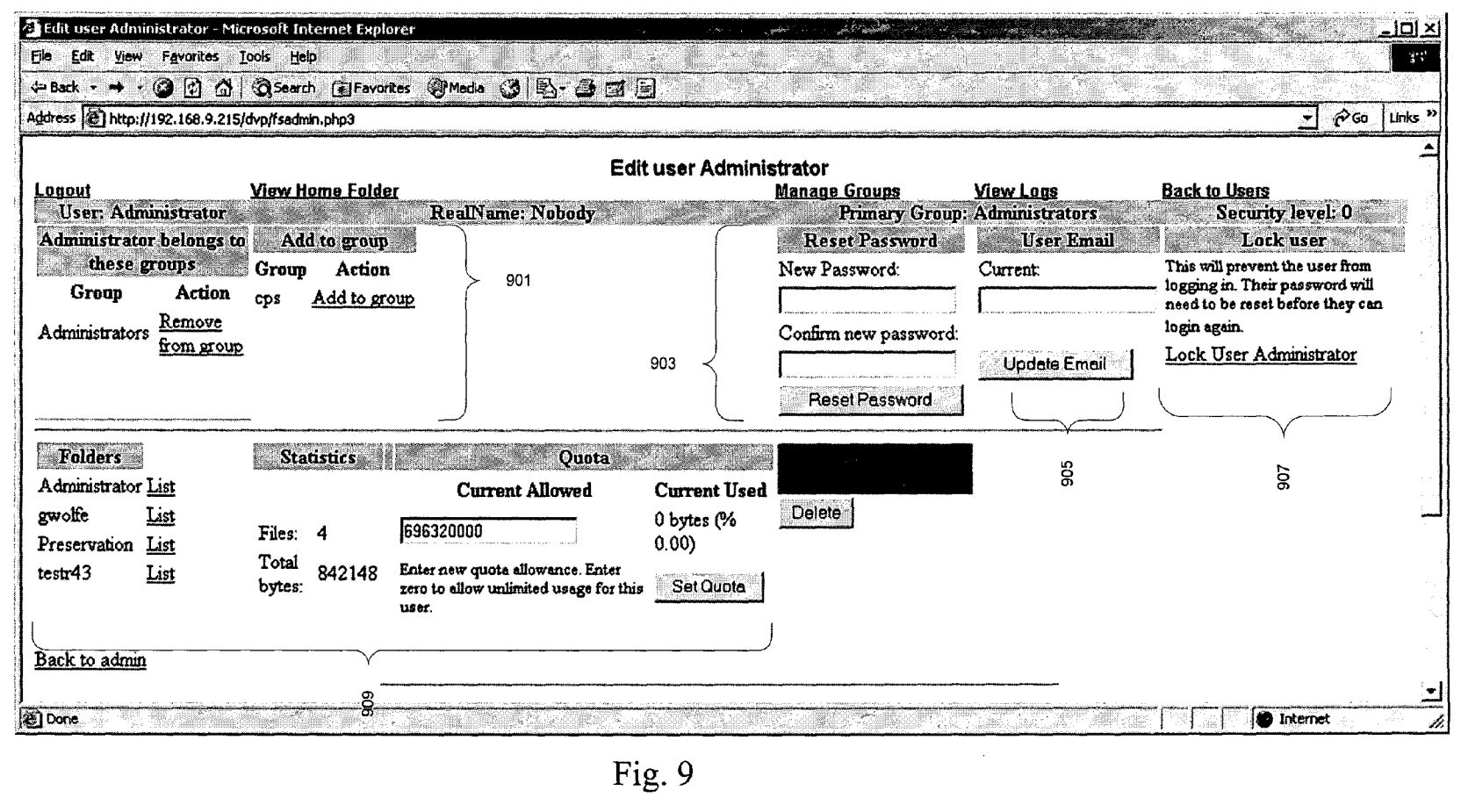

FIG. 9 highlights in specific detail features associated with a particular user "administrator." Specifically, in portion 901, a general overview of the user is given including the group(s) the user belongs to, as well as basic functionality allowing removal or addition to one or more groups. In portion 903, the user's password can be reset and in portion 905 a user's e-mail address associated with the particular user. Portion 907 summarizes the security level of the user while in portion 909 a general overview of the folders, statistics, and quota for the particular selected user are displayed.

Figure 10:
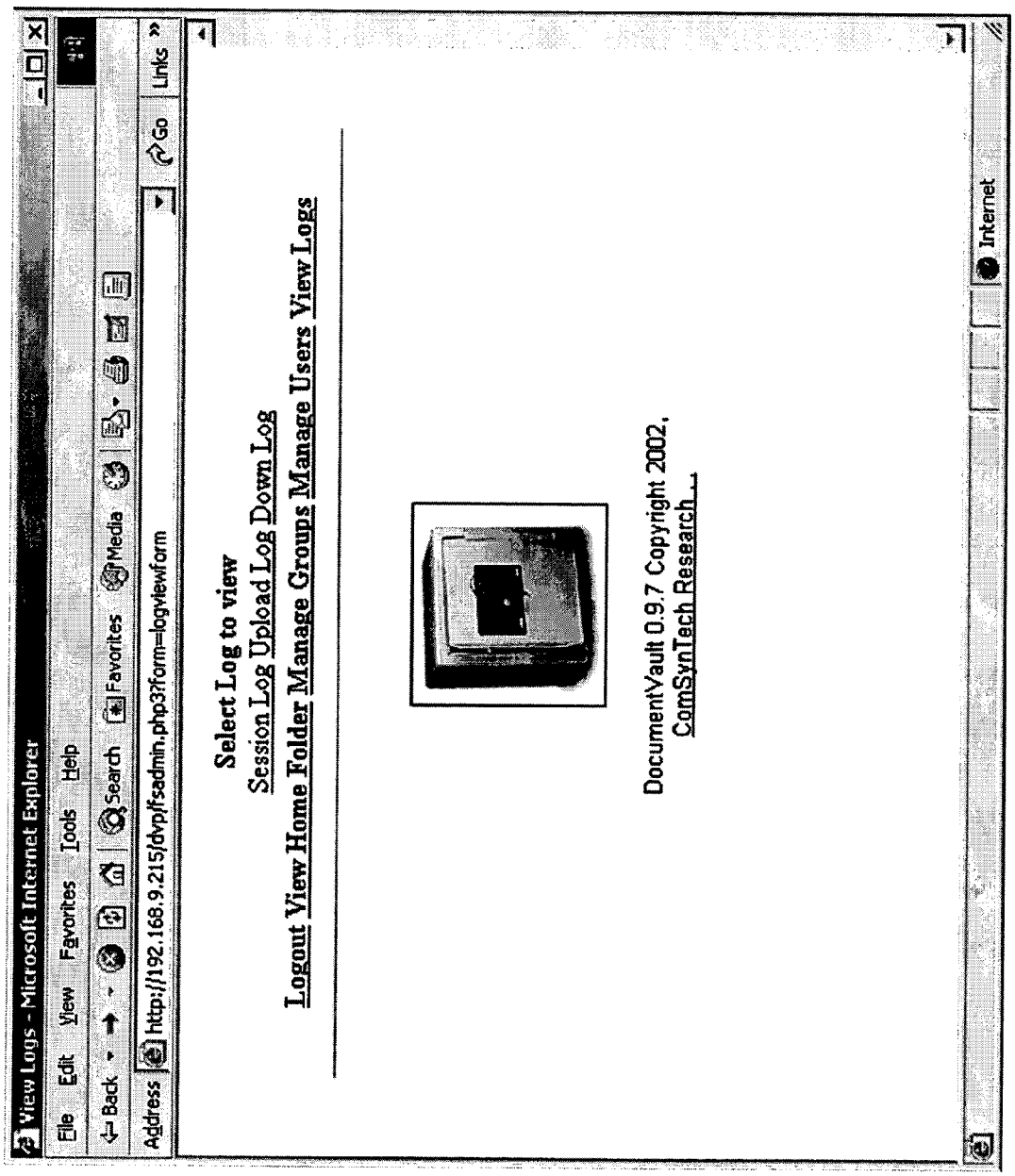

The log interface illustrated in FIG. 10 provides the ability for a user to one or more of select a session log, upload a log, download a log, or the like. In particular, these logs can contain, for example, the preservation and retrieval information associated with content that was preserved on one or more preservation media. In addition, these logs can contain basic information regarding user access to the preservation system or, in general, any information relating to the preservation system including, but not limited to, errors, capacities, historical bandwidth, user accesses, security violations, or the like.

Figure 11:
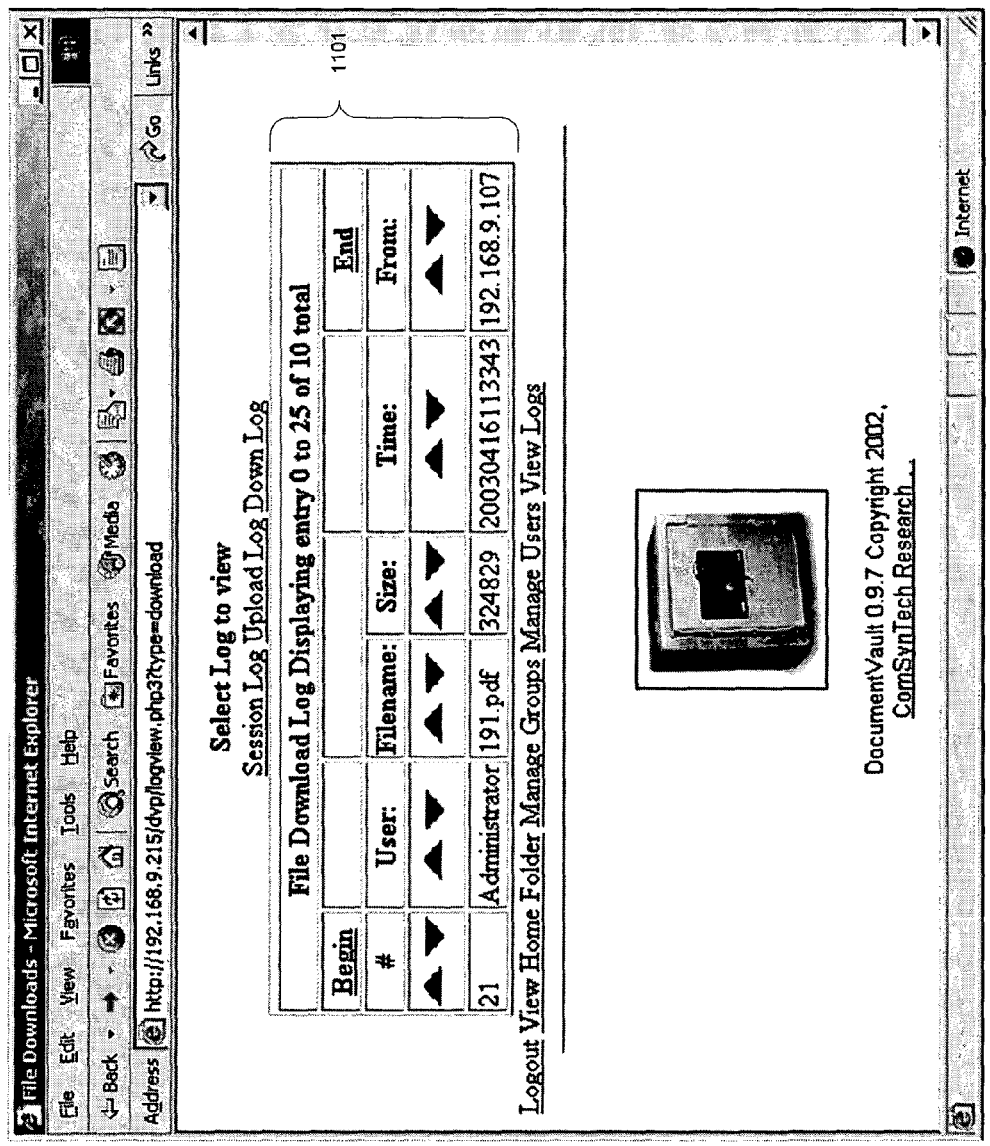

FIG. 11 illustrates in greater detail the viewing of a session log. In particular, log list 1101 illustrates the logs that are available. Upon selection of one or more logs, the logs can be downloaded and viewed, for example, by an administrator or other user.

FIG. 12 illustrates an exemplary user preference menu. In particular, in addition to the basic preferences such as password, home folder, e-mail address, and name options, additional features can be managed by a user that, for example, are stored in a profile that may specify storage options, preservations options, retrieval options, or the like. In general, any option associated with interfacing with the preservation system can be managed by one or more or a user and administrator.

Figure 13:
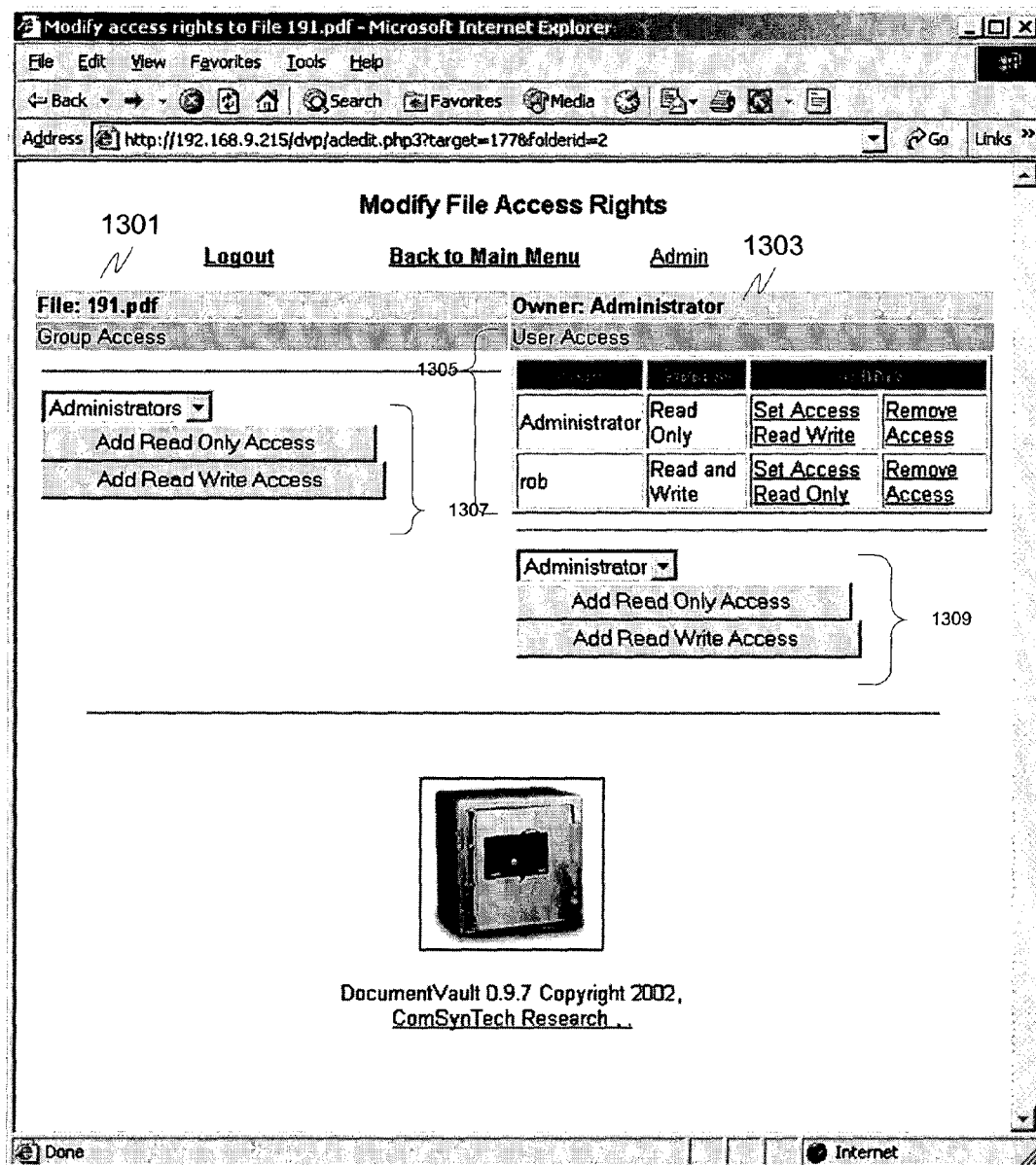

FIG. 13 illustrates an exemplary file access right interface. In particular, the selected file having associated rights is identified at 1301. In addition, confirmation such as the owner 1303 and access rights 1305 are summarized for the particular file 1301. In addition to summarization, reading and righting access can be added or modified via the buttons 1307 and 1309.

Figure 14:
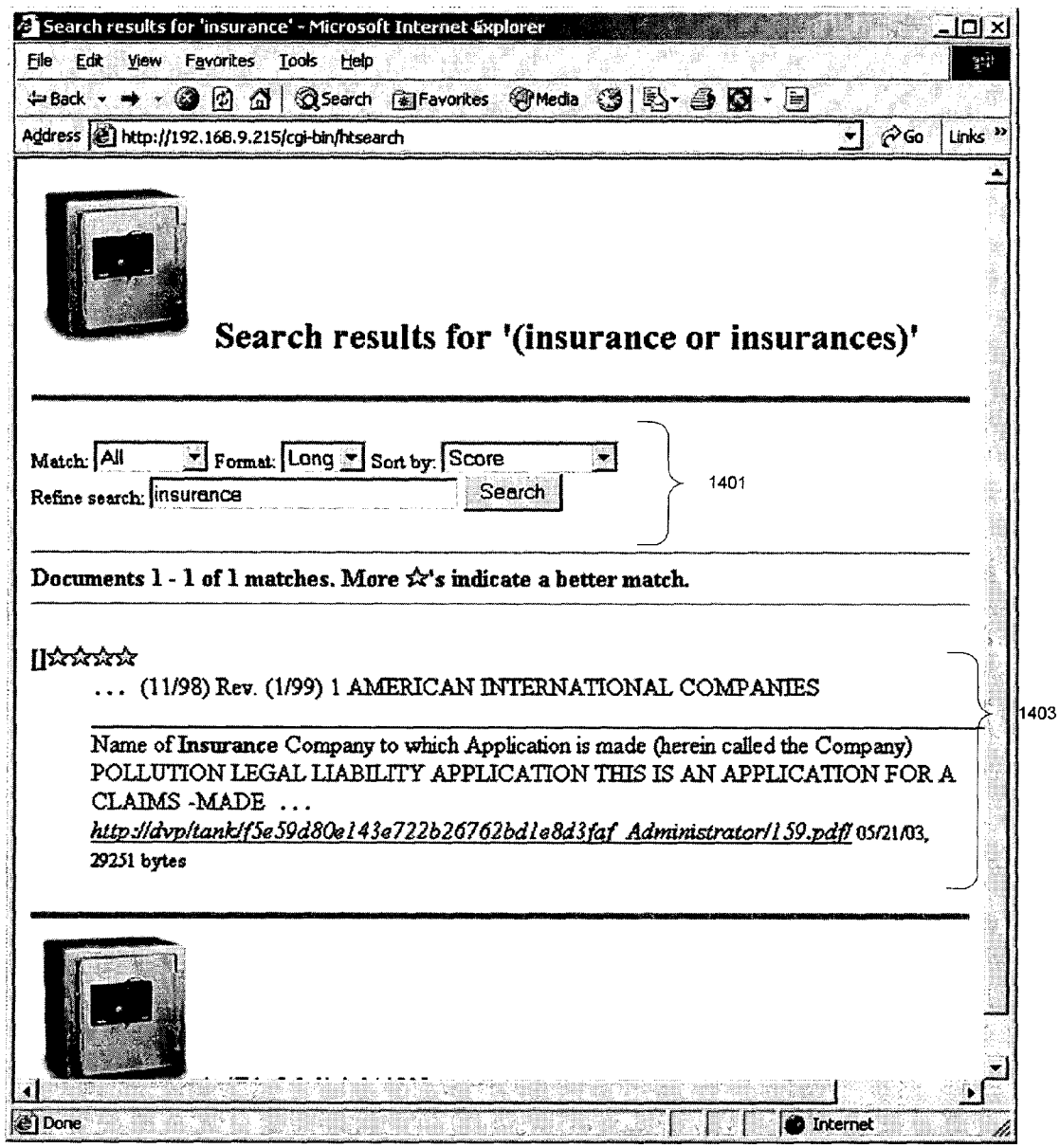

FIG. 14 illustrates an interface showing the result of performing a search using the search interface 501 illustrated in FIG. 5. In this exemplary search result interface, the search terms can optionally be reproduced in 1401 and the results displayed in a result portion 1403. In addition to just indicating a basic match, score indicators can also be associated with the one or more search results illustrated in 1403.

Figure 15:
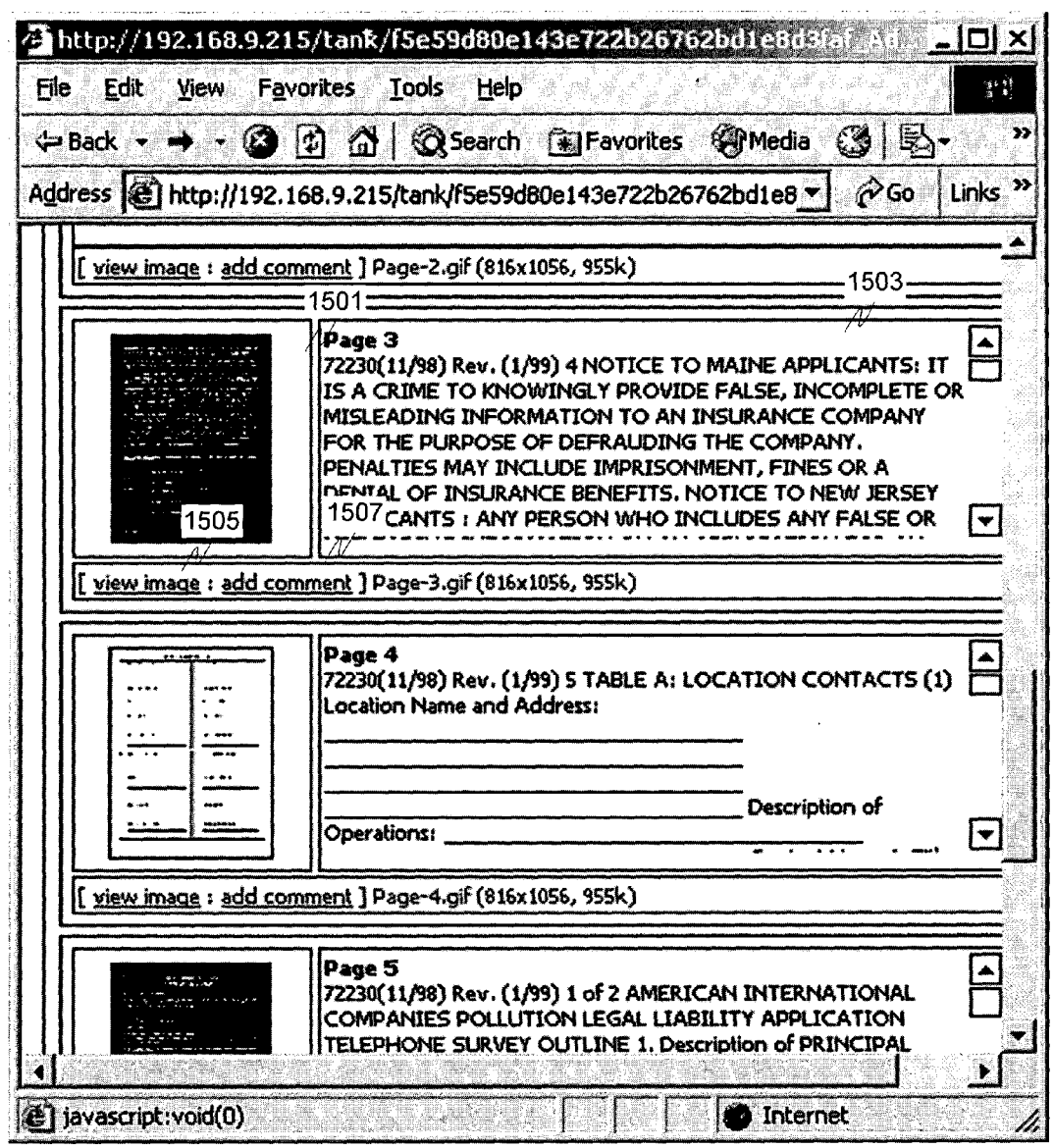

FIG. 15 illustrates an exemplary interface as a result of selecting the display thumbnail button 531. In particular, the thumbnail interface has an image portion 1501 and a text portion 1503 thus, for example, for each page within a document, a corresponding image and text portion can be shown in the thumbnail interface. In addition, a view image button 1505 can be provided that allows, for example, enlargement for better viewing of the image. Furthermore, add comment button 1507 allows a user to add a comment associated with the particular page of the displayed document.

Figure 16:
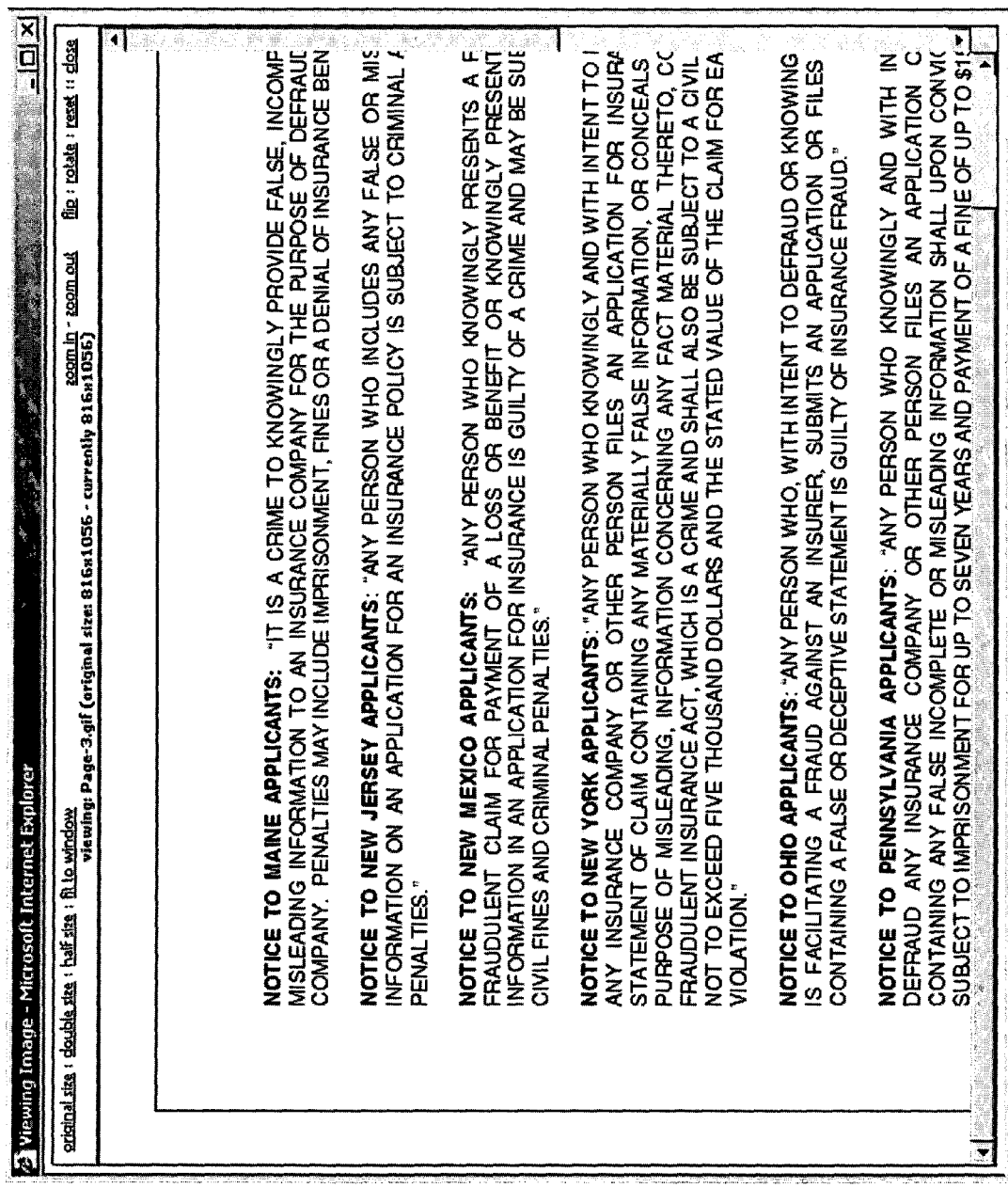
Figure 17:
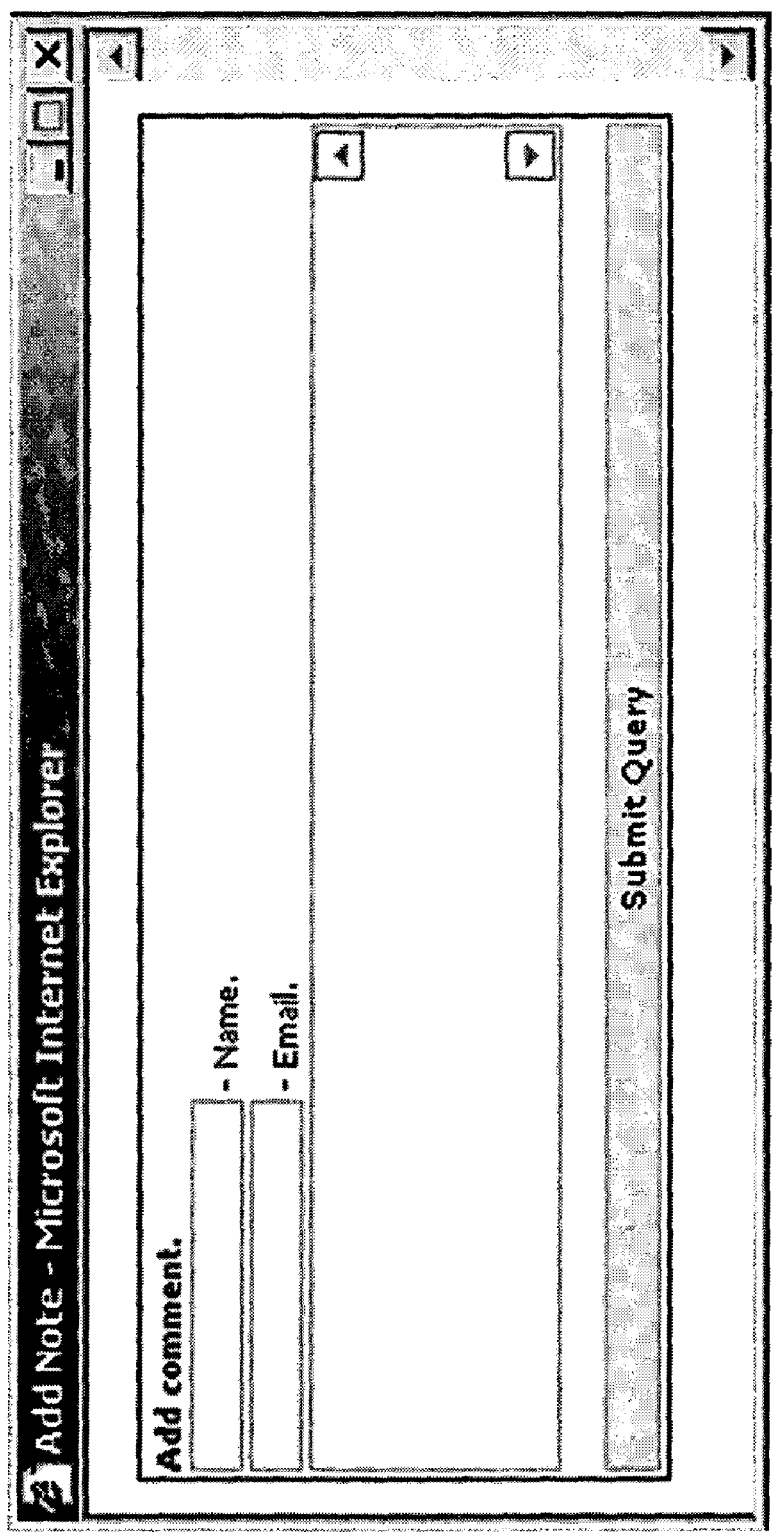

FIG. 16 illustrates an exemplary interface that results from clicking on the view image button 1505 illustrated in FIG. 15. In particular, the interface in FIG. 16 allows, for example, the manipulation of the image through navigation buttons 1601 and 1603 that allow, for example, snapping to original size, double size, half size, or fit to window, and zooming in, zooming out, flipping, rotating, resetting and closing, respectively.

Figure 18:
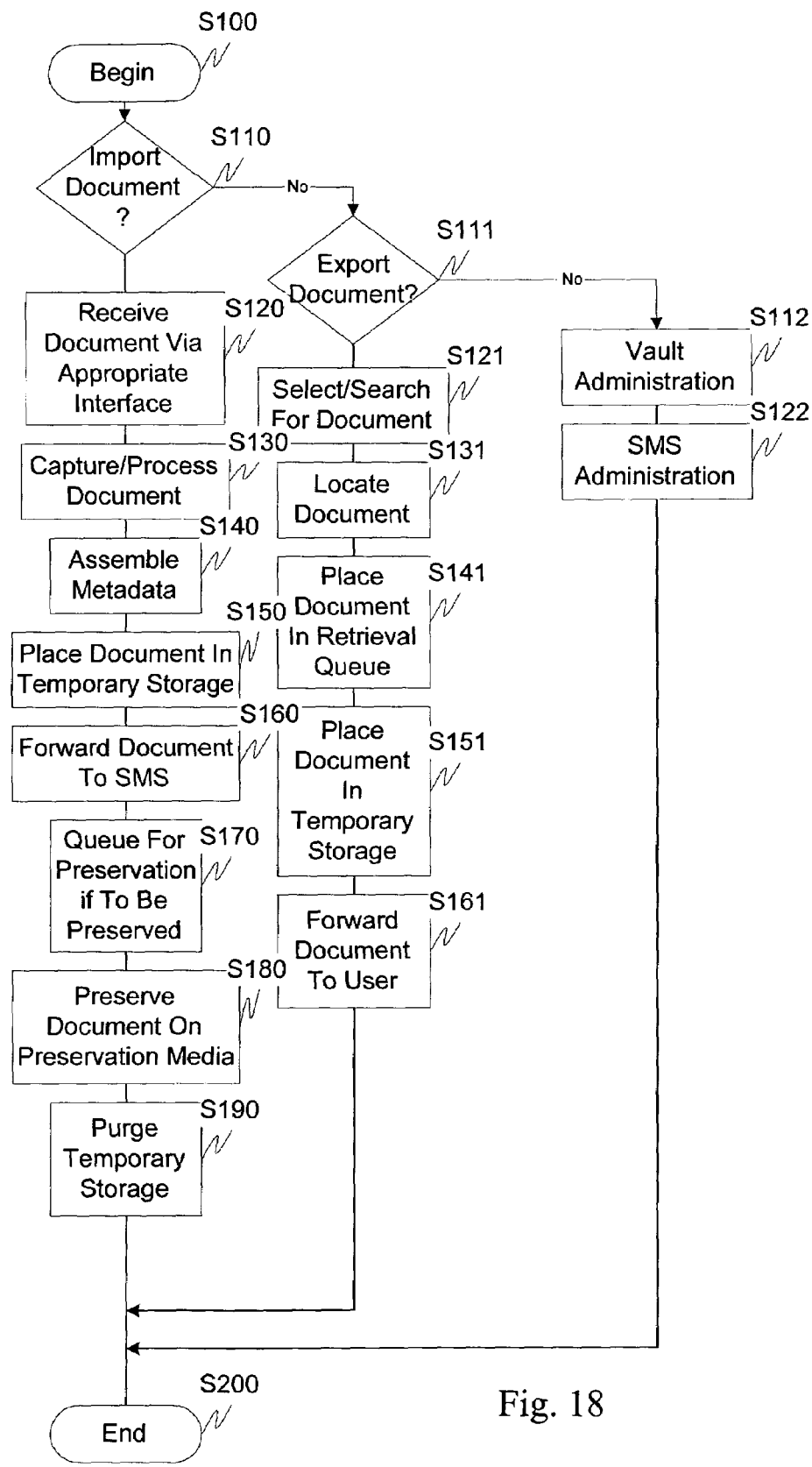
FIG. 18 is a flowchart illustrating an exemplary method of operation for document preservation according to this invention.

FIG. 18 illustrates a flowchart that provides a general overview of the functionality associated with the preservation system. In particular, control begin in step S100 and continues to step S110. In step S110, a determination is made whether to import content for preservation. If content is to be imported, control continues to step S111. Otherwise, control jumps to step 120.

In step S111, a determination is made whether preserved content is to be exported from a preservation media. If preserved content is to be exported, control continues to step S121. Otherwise, control jumps to step S112. In step S112, a user is allowed to access the preservation system to perform on or more of administrative and housekeeping functions. Control then continues to step S122 where a user is allowed to manage and/or administer the storage management system. Control then continues to step S200 where the control sequence ends.

In step S121, a user selects and or searches for preserved content. Next, in step S131, the preserved content is located. Then, in step S141, the preserved content is placed in the retrieval queue. Control then continues to step S151.

In step S151, the preserved content is place in temporary storage. Next, in step S161, the preserved content is forwarded to a user or, for example as discussed above, based on the profile forwarded to a predetermined location.

In step S120, content is received via an appropriate interface. Next, in step S130, the content is captured and or processed in preparation for preservation. Then, in step S140, metadata is assemble about the imported content. Control then continues to step S150.

In step S150, the preservation object is placed in temporary storage. Next, in step S160, the preservation object is forwarded to the storage management system. Then, in step S170, and if the preservation object is to be preserved, the preservation object is placed in the queue for preservation. In addition, as discussed above, the timing and/or specifics regarding preservation can be managed by a profile associated with one or more of the preservation object and a user. Control then continues to step S180.

In step S180, the preservation object is preserved on preservation media. Then, in step S190, temporary storage is purged and control continues to step S200 where the control sequence ends.

Figure 19:
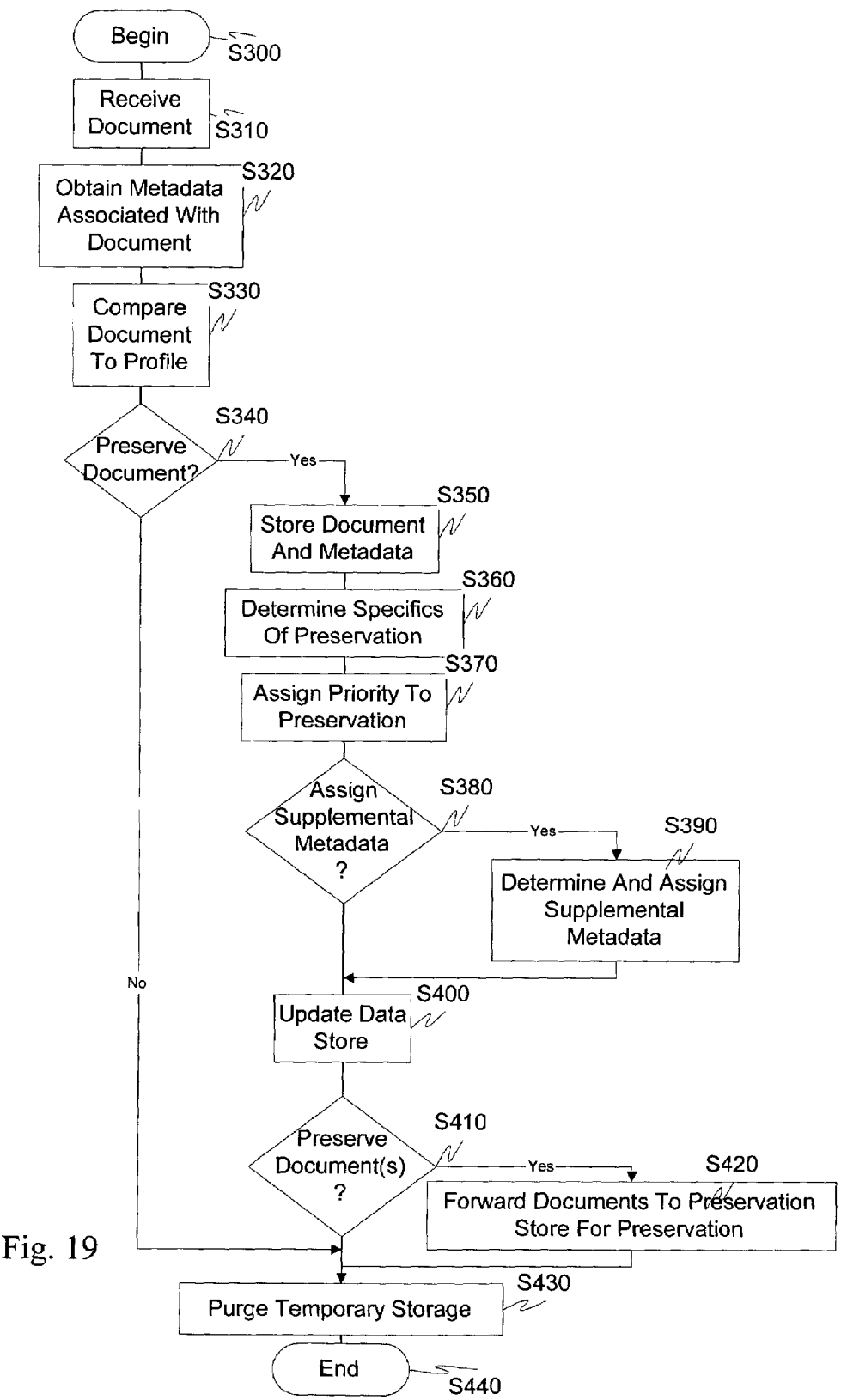
FIG. 19 is a flowchart illustrating an exemplary method of preserving a document according to this invention.

FIG. 19 illustrates in greater detail the storage and/or simulation of content on preservation media. In particular control begins in step S300 and continues to step S310. In step S310, a content is received as discussed above via the appropriate content interface. Next, in step S320, metadata associated with the content is obtained. For example, as discussed earlier, the resource of metadata is the input modality. This can include items such, for example, time, date, user, size, physical attributes, or the like. Another source for metadata is the documents itself. For example, key words can be extracted from the documents or strings of keywords extracted, for example, from an optical character recognition device, or the like. These keywords can then be used as metadata. Furthermore, other types of metadata that could be searched include shape, color, sound, or the like. Another source of metadata is that the keywords can be parsed by a natural language processing engine to generate a topic map and summary of the document. Alternatively, an appropriately authorized user may login and annotate and individual portion of the document, keywords, or the summary, or the like, and these annotations can be considered as metadata themselves. Next, in step S330, one or more of the content, metadata, and user are reviewed to determine if a profile is associated with the preservation of that document. If, as discussed above, a profile is associated with any of the above, the profile can control various aspects of the preservation process. Control then continues to step S340.

In step S340 determination is made whether to preserve the preservation object. If the preservation object is to be preserved, control continues to step S350. Otherwise, control jumps to step S430.

In step S350, the preservation object is stored in the temporary storage. Next, in step S360, the specifics regarding preservation are determined, such as time, preferences for preservation, and the like. Then, in step S370, a priority is assigned to the preservation process. Control then continues to step S380.

In step S380, a determination is made whether additional metadata should be associated with the document. If addition metadata is to be associated with the document, control continues to step S390 where additional metadata is determined/received/updated and associated with the document. Otherwise, control jumps to step S400 where the data store is updated. Control then continues to step S410.

In step S410 a determination is made whether to preserve the preservation object. If the document is to be preserved, control continues to step S420 where the documents are forwarded for preservation on preservation media by the preservation store. Control then continues to step S430.

In step S430 the temporary storage is purged. Control then continues to step S440 where the control sequence ends.

Figure 20:
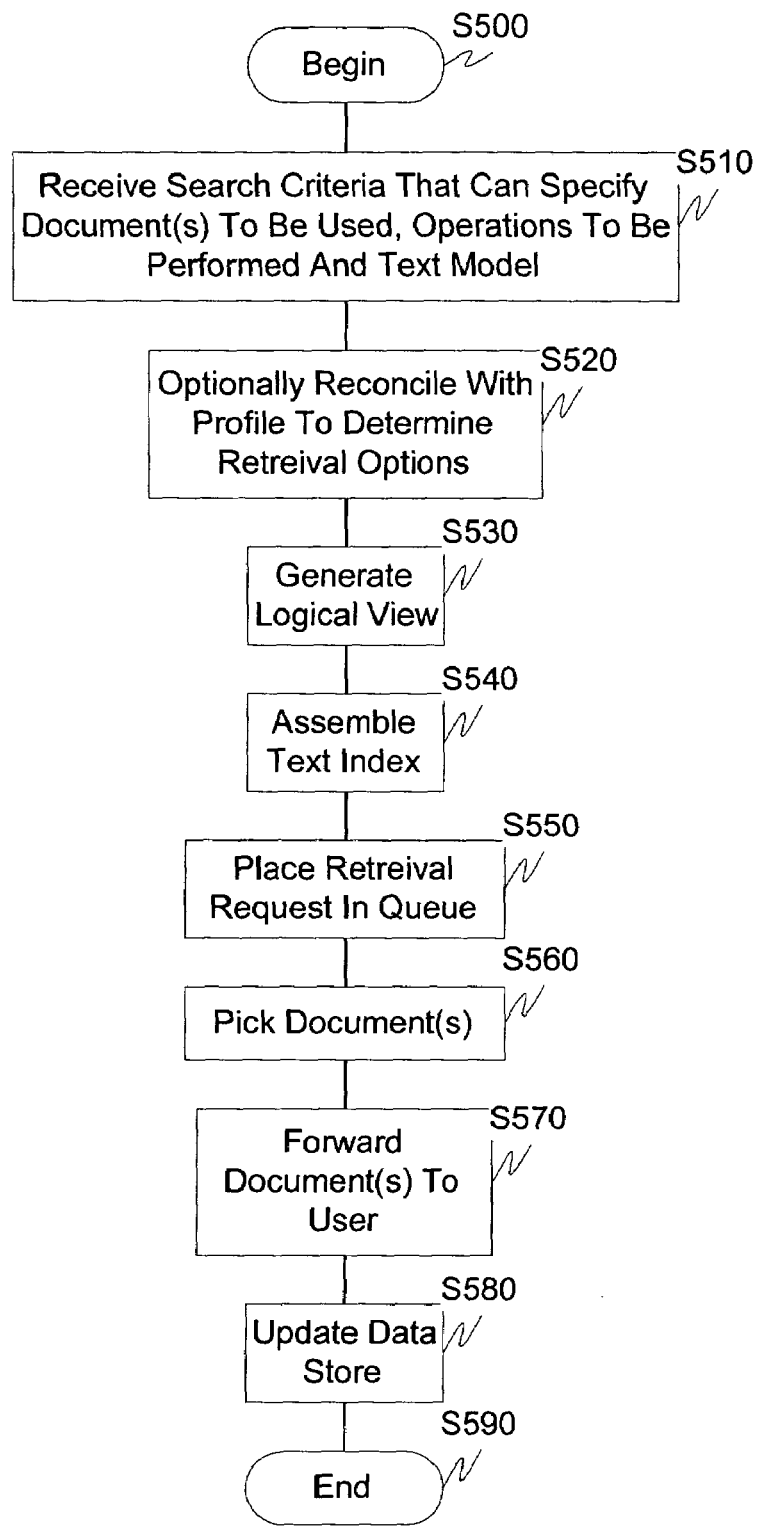
FIG. 20 is a flowchart illustrating an exemplary method of retrieving a preserved document according to this invention.

FIG. 20 illustrates an exemplary retrieval process according to this invention. In particular, control begins in step S500 and continues to step S510. In step S510, one or more of search criteria, operations to be performed, and text model specified to facilitate retrieval of preserved content. Next, in step S520, the retrieval query can be reconciled with the profile that, for example, as discusses above, specifies retrieval characteristic, display characteristics, or the like. Then, in step S530, a logical view of the requested preserved content(s) is generated. Control then continues to step S540.

In step S540, a text index is assembled for the requested preserved content. Next, in step S550, a requested document(s) is placed in the retrieval queue. Then, in step S560, the preserved content is picked from the preservation media upon which it is stored. Control then continues to step S570.

In step S570, the preserved content is forwarded to the user. Next, in step S580, the data store is updated and control continues to step S590 where the control sequence ends.

The above-described systems and methods can be implemented on a document, image and/or A/V processing device, or the like, or on a separate programmed general purpose computer having image processing capabilities. Additionally, the systems and methods of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, or the like. In general, any device capable of implementing a state machine that is in turn capable of implementing the flowcharts illustrated herein can be used to implement the preservation system according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The systems and methods illustrated herein however can be readily implemented in hardware and/or software using any known or later developed systems or structures, devices and/or software by those of ordinary skill in the applicable art from the functional description provided herein and with a general basic knowledge of the computer and storage arts.

Moreover, the disclosed methods may be readily implemented in software executed on programmed or abstract general purpose computer, a special purpose computer, a microprocessor, or the like. Likewise, the systems and methods disclosed herein may be modified based on future developments that may provide better a preservation store and associated media. In these instances, the systems and methods of this invention can be implemented as a program embedded on personal computer such as JAVA® or CGI script, as a resource residing on a server or graphics workstation, as a routine embedded in a dedicated preservation system, or the like. The system can also be implemented by physically incorporating the system and method into a software and/or hardware system, such as the hardware and software systems of a preservation system.

It is, therefore, apparent that there has been provided, in accordance with the present invention, systems and methods for content preservation. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. A content preservation system comprising:
   at least one content interface adapted to receive content from a source and forward the content in an originating format;
   a document vault configured to receive the content and to generate one or more preservation objects, each preservation object at least including a digital version of the received content, a serial number and metadata associated with the received content;
   a storage management system that manages preservation specifics and queues the one or more preservation objects for preservation, at least a portion of the preservation specifics governed by a profile specifying a manner in which the one or more preservation objects are to be stored on preservation media based at least partially on a type of preservation media to be used; and
   a preservation store adapted to preserve the one or more preservation objects on the preservation media.

2. The system of claim 1, further comprising a shelf management module adapted to perform classification, indexing, management and retrieval functionality of the preservation object.

3. The system of claim 1, further comprising a data store, the data store adapted to store the metadata that serves as a representation of preservation object datum and indexers.

4. The system of claim 3, wherein the data store has the ability to preserve a representation of the data store itself with a superset of all or a portion of preservation requirements of managed jobs.

5. The system of claim 1, further comprising a preservation store controller that cooperates with the preservation store to preserve the one or more preservation objects on the preservation media.

6. The system of claim 1, further comprising a profile module capable of specifying preferences for one or more of preservation, retrieval, metadata and queue management.

7. The system of claim 1, further comprising a retrieval interface that cooperates with storage management system to facilitate retrieval of the one or more preserved preservation objects.

8. The system of claim 7, wherein one or more of a preserved content identifier, a Boolean query, a text model and a query can be used to search for the preserved one or more preservation objects.

9. The system of claim 1, wherein the content preservation system is adapted to be associated with one or more of a print cartridge, a toner bottle and an ink reservoir.

10. The system of claim 1, wherein the content is at least one of a document, digital content, a facsimile, multimedia, e-mail, video, web page and music.

11. The system of claim 1, wherein the content preservation system stores the one or more preservation objects for at least one of an indefinite or predetermined amount of time on the preservation media.

12. A method of preserving content comprising:
receiving content from a content source;
forwarding the content in an originating format;
associating metadata with received content;
generating one or more preservation objects, each preservation object at least including a digital version of the received content, a serial number and metadata associated with the received content;
determining preservation specifics for the one or more preservation objects, at least a portion of the preservation specifics governed by a profile specifying a manner in which the preservation object are to be stored on preservation media based at least partially on a type of preservation media to be used;
queuing one or more preservation objects for preservation; and
preserving the one or more preservation objects on the preservation media.

13. The method of claim 12, further comprising providing classification, indexing, management and retrieval functionality for the one or more preservation objects.

14. The method of claim 12, further comprising storing metadata in a data store that represents preservation object datum and indexers.

15. The method of claim 14, wherein the data store has the ability to preserve a representation of the data store itself with a superset of all or a portion of preservation requirements of managed jobs.

16. The method of claim 12, further comprising consulting the profile for one or more preferences related to one or more of preservation, retrieval, metadata and queue management.

17. The method of claim 12, further comprising determining and monitoring a retrieval interface that facilitates retrieval of the one or more preservation objects.

18. The method of claim 17, wherein one or more of a preserved content identifier, a Boolean query, a text model and a query can be used to search for the one or more preservation objects.

19. The method of claim 12, wherein the content is received from one or more of a print cartridge, a toner bottle and an ink reservoir.

20. The method of claim 12, wherein the content is at least one of a document, digital content, a facsimile, multimedia, e-mail, video, web page and music.

21. The method of claim 12, further comprising archiving the one or more preservation objects for at least one of an indefinite or predetermined amount of time on the reservation media.

22. A system for preserving content comprising:
means for receiving content from a content source;
means for forwarding the content in an originating format;
means for associating metadata with received content;
means for generating one or more preservation objects, each preservation object at least including a digital version of the received content, a serial number and metadata associated with the received content;
means for determining preservation specifics for the one or more preservation objects, at least a portion of the preservation specifics governed by a profile specifying a manner in which the one or more preservation objects are to be stored on preservation media based at least partially on a type of preservation media to be used;
means for queuing one or more preservation objects for preservation;
and means for preserving the one or more preservation objects on the preservation media.

23. The system of claim 22, further comprising means for providing classification, indexing, management and retrieval functionality for the one or more preservation objects.

24. The system of claim 22, further comprising means for storing metadata in a data store that represents preservation object datum and indexers.

25. The system of claim 24, wherein the data store has the ability to preserve a representation of the data store itself with a superset of all or a portion of preservation requirements of managed jobs.

26. The system of claim 22, further comprising means for consulting the profile for one or more preferences related to one or more of preservation, retrieval, metadata and queue management.

27. The system of claim 22, further comprising means for determining and monitoring a retrieval interface that facilitates retrieval of the one or more preservation objects.

28. The system of claim 27, wherein one or more of a preserved content identifier, a Boolean query, a text model and a query can be used to search for the one or more preservation objects.

29. The system of claim 22, further comprising means for receiving content from one or more of a print cartridge, a toner bottle and an ink reservoir.

30. The method of claim 22, wherein the content is at least one of a document, digital content, a facsimile, multimedia, e-mail, video, web page and music.

31. The method of claim 22, further comprising means for archiving the one or more preservation objects for at least one of an indefinite or predetermined amount of time on the preservation media.

32. A computer readable storage medium including information for preserving content comprising:
information that receives content from a source;
information that forwards the content in an originating format;
information that associates metadata with received content;
information that generates one or more preservation objects, each preservation object at least including a digital version of the received content, a serial number and metadata associated with the received content;
information that determines preservation specifics for the one or more preservation objects, at least a portion of the preservation specifics governed by a profile specifying a manner in which the one or more preservation objects are to be stored on preservation media based at least partially on a type of preservation media to be used;
information that queues one or more preservation objects for preservation;
and information that controls the preservation of the one or more preservation objects on physical preservation media.

* * * * *